United States Patent
Wei et al.

(10) Patent No.: US 11,481,231 B2
(45) Date of Patent: Oct. 25, 2022

(54) SYSTEMS AND METHODS FOR INTELLIGENT APPLICATION INSTANTIATION

(71) Applicant: Citrix Systems, Inc., Fort Lauderdale, FL (US)

(72) Inventors: Daowen Wei, Nanjing (CN); Jian Ding, Nanjing (CN); Hengbo Wang, Nanjing (CN); Jian Piao, Nanjing (CN); Jinping Liu, Nanjing (CN); Divyansh Deora, Bengaluru (IN); Arnav Akhoury, Bengaluru (IN); Nandikotkur Achyuth, Bengaluru (IN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 462 days.

(21) Appl. No.: 16/590,752

(22) Filed: Oct. 2, 2019

(65) Prior Publication Data

US 2021/0103447 A1    Apr. 8, 2021

(51) Int. Cl.
*G06F 9/00* (2006.01)
*G06F 15/177* (2006.01)
(Continued)

(52) U.S. Cl.
CPC ........ *G06F 9/4451* (2013.01); *G06F 11/3466* (2013.01); *H04W 4/029* (2018.02)

(58) Field of Classification Search
CPC ... G06F 9/4451; G06F 11/3466; H04W 4/029
See application file for complete search history.

(56) References Cited

U.S. PATENT DOCUMENTS

2005/0125509 A1   6/2005   Ramachandran
2008/0091441 A1   4/2008   Flammer
(Continued)

FOREIGN PATENT DOCUMENTS

CN   101902490 A   12/2010
CN   104601416 A   5/2015
(Continued)

OTHER PUBLICATIONS

PCT International Search Report and Written Opinion dated Nov. 20, 2020 for International Application No. PCT/US2020/052399; 15 pages.
(Continued)

*Primary Examiner* — Nitin C Patel
(74) *Attorney, Agent, or Firm* — Daly, Crowley, Mofford & Durkee, LLP

(57) ABSTRACT

The systems and methods discussed herein provide for intelligent identification of applications or tasks to be utilized or performed by a user based on a variety of variables that provide relevant context. In some implementations, applications may be pre-launched or instantiated prior to a user requesting to execute the application, reducing user experience latency and avoiding incorrect application launch. User behavior patterns, location, time of day, user events, etc. may be utilized to identify and recommend or pre-launch relevant applications that should or can be used at any given instance. In some implementations, deep linking may be used to pre-launch or suggest specific tasks to be performed within an application.

18 Claims, 20 Drawing Sheets

(51) Int. Cl.
*G06F 9/445* (2018.01)
*H04W 4/029* (2018.01)
*G06F 11/34* (2006.01)

(56) References Cited

U.S. PATENT DOCUMENTS

| | | |
|---|---|---|
| 2009/0060469 A1 | 3/2009 | Olague |
| 2009/0106347 A1 | 4/2009 | Harwood |
| 2009/0260021 A1 | 10/2009 | Haenel |
| 2012/0079477 A1 | 3/2012 | Boss |
| 2018/0054420 A1 | 2/2018 | Mindte |
| 2018/0121465 A1 | 5/2018 | Bajaj |
| 2018/0217736 A1* | 8/2018 | Nam .................. G06F 3/04842 |
| 2019/0347107 A1* | 11/2019 | Ma ....................... G06F 11/302 |
| 2020/0358714 A1 | 11/2020 | Singleton, IV |

FOREIGN PATENT DOCUMENTS

| | | |
|---|---|---|
| CN | 104780191 A | 7/2015 |
| CN | 108551419 A | 9/2018 |
| CN | 110166577 A | 8/2019 |

OTHER PUBLICATIONS

Jo, et al., "Automatic Generation of GUI for Smartphone IME by Classifying User Behavior Patterns;" 2015 7th International Conference of Soft Computing and Pattern Recognition (SoCPaR); Nov. 13, 2015; 4 pages.

Jain, et al., "Contextual Adaptive User Interface for Android Devices;" 2013 Annual IEEE India Conference (INDICON); Dec. 13, 2013; 5 pages.

Basu, et al., "Multi-user Adaptive Launcher for Android;" 2019 Twelfth International Conference on Contemporary Computing (IC3); Aug. 8, 2019; 6 pages.

Notice of Allowance dated Feb. 4, 2021 for U.S. Appl. No. 16/404,007; 7 pages.

International Search Report and Written Opinion for App. No. PCT/CN2021/096755, dated Mar. 1, 2022, 10 pages.

Office Action dated May 6, 2022 for U.S. Appl. No. 17/363,338 (pp. 1-21).

Office Action dated Aug. 24, 2022 for U.S. Appl. No. 17/363,338 (pp. 1-24).

* cited by examiner

SYSTEMS AND METHODS FOR INTELLIGENT APPLICATION INSTANTIATION

FIELD OF THE DISCLOSURE

The present application generally relates to scheduling and execution of applications.

BACKGROUND OF THE DISCLOSURE

Computing devices, including mobile devices such as smartphones or smart watches, have made it convenient for users to access dozens or even hundreds of applications to perform work or personal tasks. However, the sheer number of possible applications and tasks available frequently "overloads" users, making it difficult or inefficient to identify which application is appropriate for use at a given time, or which task should be performed first. "Smart" assistants are able to perform simple tasks based on explicit instructions from a user, such as launching a specific application when requested or identifying an upcoming calendar appointment, but these devices lack intelligence for suggesting or recommending complex tasks to the user. This results in a poor user experience, and reduces user productivity. Additionally, computing processing resources may be wasted by users launching an incorrect application to perform a task and having to exit the application and launch a new application, and memory usage may be increased if users maintain hundreds of applications on a mobile device with limited memory, even though only a small subset of these applications may be utilized in a given time period.

BRIEF SUMMARY OF THE DISCLOSURE

The systems and methods discussed herein provide for intelligent identification of applications or tasks to be utilized or performed by a user based on a variety of variables that provide relevant context. In some implementations, applications may be pre-launched or instantiated prior to a user requesting to execute the application, reducing user experience latency and avoiding incorrect application launch. In some implementations, applications that are rarely utilized or will likely not be utilized in an upcoming time period and/or data associated with the applications may be removed from the computing device to reduce memory usage, and may be pre-fetched or downloaded in advance of a time period in which the applications will likely be used. User behavior patterns, location, time of day, user events, etc. may be utilized to identify and recommend or pre-launch relevant applications that should or can be used at any given instance. In some implementations, deep linking may be used to pre-launch or suggest specific tasks to be performed within an application (e.g. a link to specific data or pages within a web application associated with the identified task).

In one aspect, the present disclosure is directed to a computing device. The computing device includes a processor, a location sensor, and a memory storing a first application. The processor is configured to: receive a location of the computing device via the location sensor; identify a current time; determine that the location of the computing device and the current time correspond to a time and location pattern associated with the first application; and provide an identification of the first application via a user interface of the computing device (e.g. a link, an icon, a title, or other such identification of the application), responsive to the determination that the location of the computing device and the current time correspond to the time and location pattern associated with the first application.

In some implementations, the processor is further configured to launch the first application while suppressing display of output of the first application, responsive to the determination that the location of the computing device and the current time correspond to the time and location pattern associated with the first application. In a further implementation, the processor is further configured to display output of the first application, responsive to detecting an interaction via the user interface with the identification of the first application.

In some implementations, the processor is further configured to: detect a launch of the first application responsive to an interaction with a user interface of the computing device; identify a time of launch of the first application and a location of the computing device at the time of launch of the first application; and generate the time and location pattern associated with the first application based on the identified time of launch of the first application and the location of the computing device at the time of launch of the first application.

In some implementations, the processor is further configured to: determine that the location of the computing device and the current time corresponding to a second time and location pattern associated with a second application; calculate a first score for the first application and a second score for the second application, based on a historical log of access to the first application and second application by the computing device; and provide an identification of the second application via the user interface of the computing device, responsive to the determination that the location of the computing device and the current time correspond to the second time and location pattern associated with the second application. In such implementations, the identification of the first application and the identification of the second application are provided in order according to the first score and the second score. In a further implementation, the processor is further configured to calculate each of the first score and the second score based on a number of accesses to the corresponding application by the computing device in a given (predetermined or dynamically determined) time period. In a still further implementation, the processor is further configured to calculate each of the first score and the second score, adjusted by a cooling function. In another still further implementation, the processor is further configured to calculate each of the first score and the second score proportional to a proportion of accesses of the corresponding application out of a number of accesses of applications by the computing device during the predetermined time period. In a further implementation, the processor is further configured to calculate each of the first score and the second score based on a number of accesses to the corresponding application by a plurality of computing devices in a given ((predetermined or dynamically determined) time period while each computing device by said plurality of computing devices is within a given distance of the location of the computing device.

In another aspect, the present application is directed to a method, including receiving, by a processor of a computing device via a location sensor of the computing device, a location of the computing device. The method also includes identifying, by the processor, a current time. The method also includes determining, by the processor, that the location of the computing device and the current time correspond to a time and location pattern associated with a first application. The method also includes providing, by the processor via a user interface of the computing device, an identification of the first application, responsive to the determination that the location of the computing device and the current time correspond to the time and location pattern associated with the first application.

In some implementations, the method includes launching, by the processor, the first application while suppressing display of output of the first application, responsive to the determination that the location of the computing device and the current time correspond to the time and location pattern associated with the first application. In a further implementation, the method includes displaying output of the first application, via a display of the computing device, responsive to detecting an interaction via the user interface with the identification of the first application.

In some implementations, the method includes detecting, by the processor, a launch of the first application responsive to an interaction with a user interface of the computing device; identifying, by the processor, a time of launch of the first application and a location of the computing device at the time of launch of the first application; and generating, by the processor, the time and location pattern associated with the first application based on the identified time of launch of the first application and the location of the computing device at the time of launch of the first application.

In some implementations, the method includes determining, by the processor, that the location of the computing device and the current time correspond to a second time and location pattern associated with a second application; calculating, by the processor, a first score for the first application and a second score for the second application, based on a historical log of access to the first application and second application by the computing device; and providing, by the processor via the user interface of the computing device, an identification of the second application, responsive to the determination that the location of the computing device and the current time correspond to the second time and location pattern associated with the second application. In such implementations, the identification of the first application and the identification of the second application are provided in order according to the first score and the second score. In a further implementation, the method includes calculating, by the processor, each of the first score and the second score based on a number of accesses to the corresponding application by the computing device in a predetermined time period. In a still further implementation, the method includes calculating, by the processor, each of the first score and the second score, adjusted by a cooling function. In another still further implementation, the method includes calculating, by the processor, each of the first score and the second score proportional to a proportion of accesses of the corresponding application out of a number of accesses of applications by the computing device during the predetermined time period. In another further implementation, the method includes calculating, by the processor, each of the first score and the second score based on a number of accesses to the corresponding application by a plurality of computing devices in a predetermined time period while each computing device by said plurality of computing devices is within a predetermined distance of the location of the computing device.

In still another aspect, the present disclosure is directed to a non-transitory computer-readable medium having instructions stored thereon that, when executed by a process of a computing device, cause the computing device to: receive, via a location sensor of the computing device, a location of the computing device; identify a current time; determine that the location of the computing device and the current time correspond to a time and location pattern associated with a first application; and provide, via a user interface of the computing device, an identification of the first application, responsive to the determination that the location of the computing device and the current time correspond to the time and location pattern associated with the first application.

In a further implementation, the computer-readable medium includes instructions that cause the computing device to: launch the first application while suppressing display of output of the first application, responsive to the determination that the location of the computing device and the current time correspond to the time and location pattern associated with the first application; and display output of the first application, responsive to detecting an interaction via the user interface with the identification of the first application.

The details of various embodiments are set forth in the accompanying drawings and the description below.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
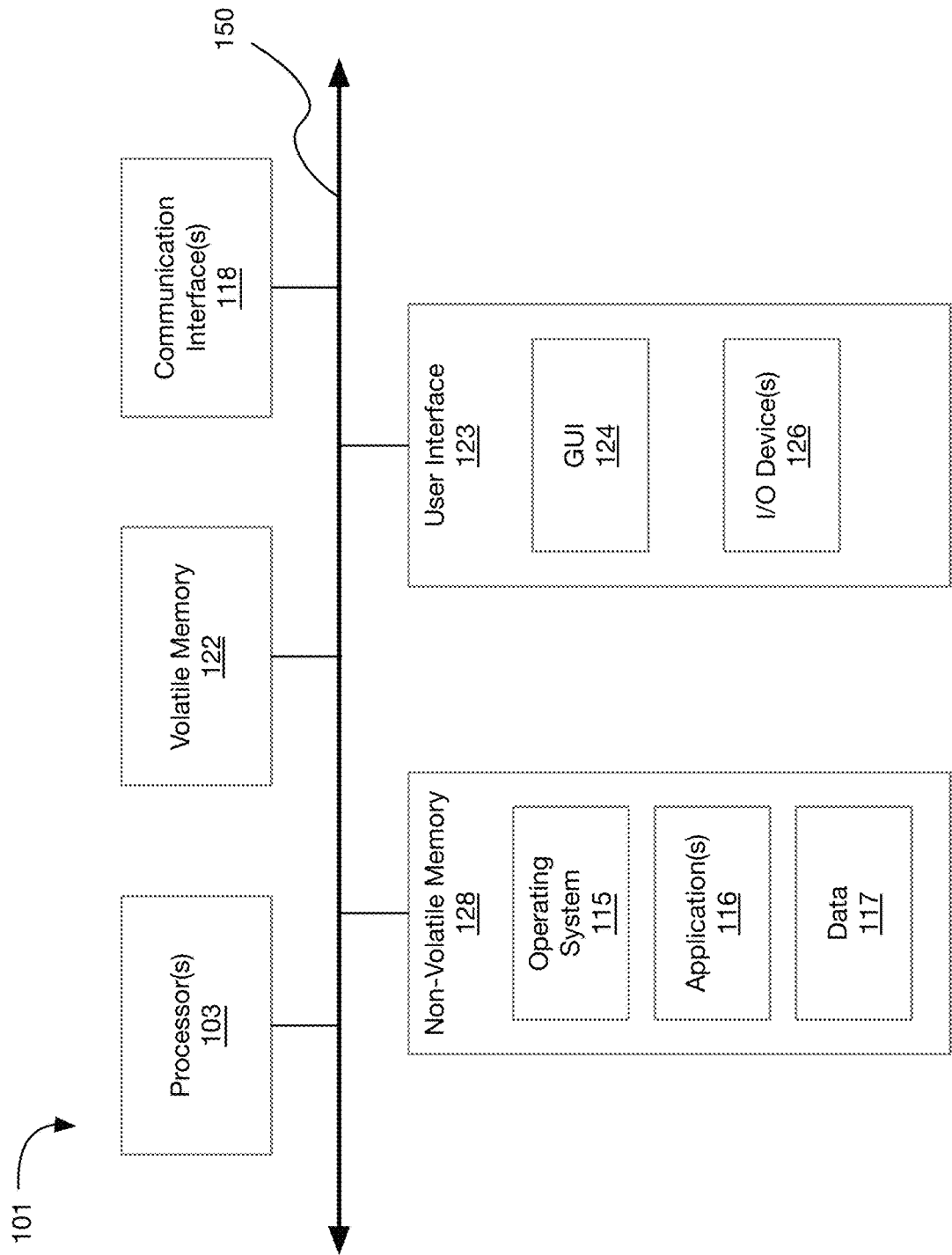
FIG. 1 is a block diagram illustrating an implementation of a network environment for use with the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for intelligent application instantiation.

A. Computing Environment

Prior to discussing the specifics of embodiments of the systems and methods of intelligent application instantiation, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Intelligent Application Instantiation

Computing devices, including mobile devices such as smartphones or smart watches, have made it convenient for users to access dozens or even hundreds of applications to perform work or personal tasks. However, the sheer number of possible applications and tasks available frequently "overloads" users, making it difficult or inefficient to identify which application is appropriate for use at a given time, or which task should be performed first. "Smart" assistants are able to perform simple tasks based on explicit instructions from a user, such as launching a specific application when requested or identifying an upcoming calendar appointment, but these devices lack intelligence for suggesting or recommending complex tasks to the user. This results in a poor user experience, and reduces user productivity.

For example, for many users, daily use of applications may be relatively regular. A user may tend to use specific applications or perform specific tasks within applications when he or she is at a specific place at a specific time. For some combinations of times and places, groups of users are also likely to use similar applications or perform similar tasks. However, many users have hundreds of applications installed on their mobile devices or smartphones, which makes some applications difficult to locate. Some users may put commonly used applications in a prominent position of their smartphone desktop, but it still takes some time to unlock the smartphone, find a desired app, launch the app, and navigate through screens or pages of the app to perform some desired function. The whole process is repetitive and time-consuming.

Figure 2A:
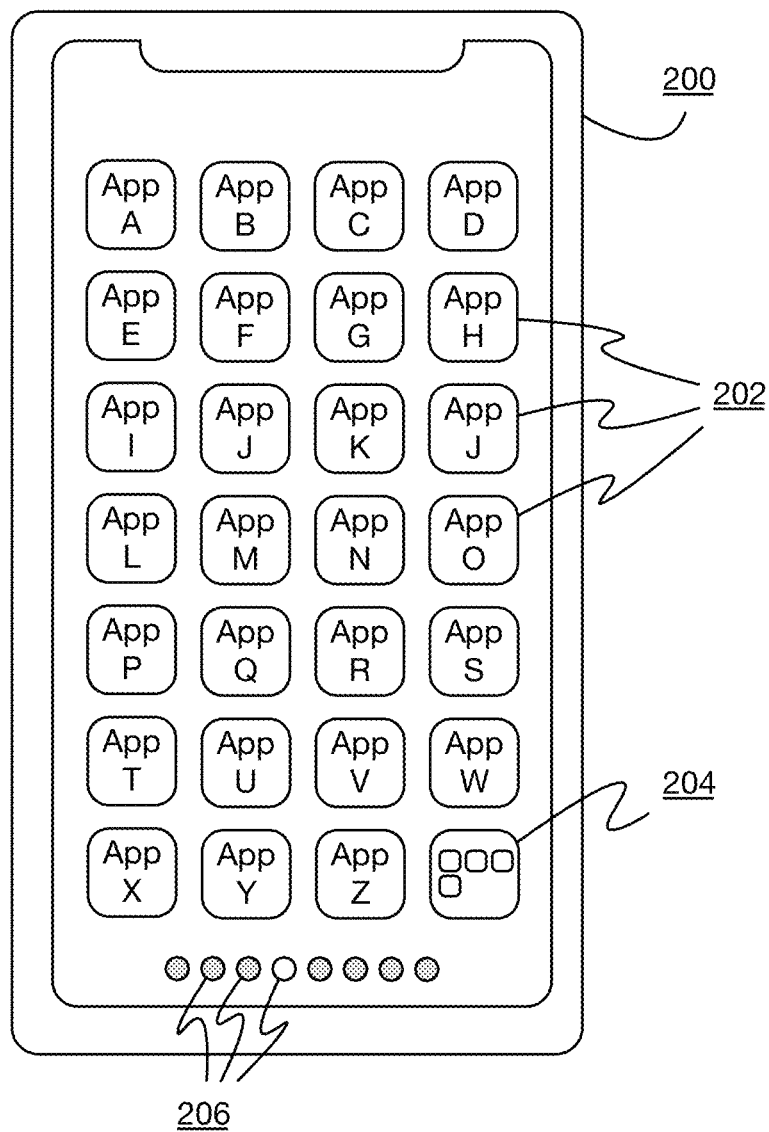
FIG. 2A is an illustration of a smartphone desktop with a plurality of application icons, according to some implementations.

For example, and referring briefly to FIG. 2A, illustrated is a smartphone desktop 200 with a plurality of application icons 202, according to some implementations. In some implementations, applications may be grouped together in a folder or category of applications 204. This may allow for some organization, but requires additional selections or clicks to find a desired application. In many implementations, if a device has more applications installed than will fit within a single screen (e.g. a grid of icons having predetermined dimensions), then the device may provide multiple pages of icons (e.g. shown by page indicators 206, with the example illustrating active page 4 out of 8 pages). For example, most mobile devices may be able to show up to about 24 icons at once per page due to limited screen sizes. Icons that do not fit on the screen can either be put on a new page to be reached by scrolling, and/or can be organized hierarchically into icon folders to be accessed by navigating.

Figure 2B:
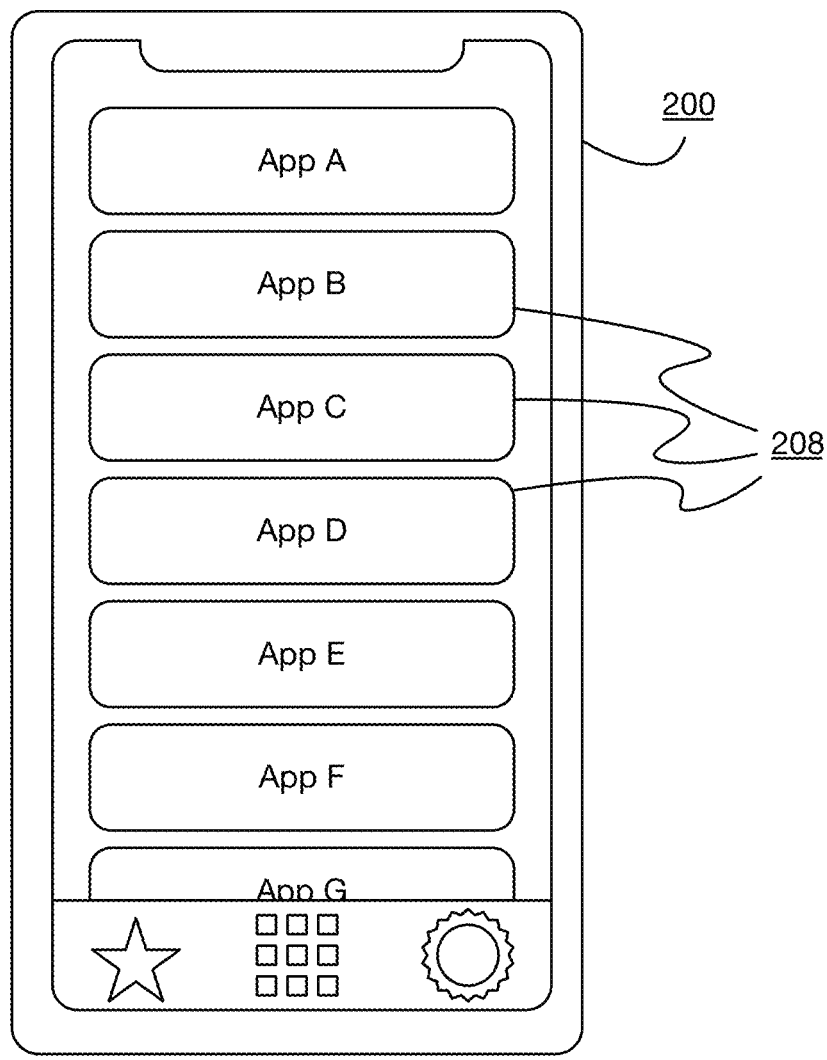
FIG. 2B is an illustration of a list of web applications or hosted applications provided via a hosted application interface according to some implementations.

As mentioned above, this difficulty with finding and selecting applications is present both with local applications and with virtual applications or hosted applications provided by an application server or cloud server (sometimes referred to as web applications). For example, a user may launch a web application or remote desktop application, and then have any number of hosted applications to select from to perform a particular task. FIG. 2B is an illustration of a list of web applications or hosted applications provided via a hosted application interface, sometimes referred to as a virtual workspace, remote workspace, web application workspace, or by similar terms. The workspace may comprise a local application executing an embedded browser application or similar application for accessing web applications or hosted applications (e.g. virtual applications, remote desktop applications, etc.) provided by an application server or remote server. The hosted applications may be listed in a scrollable list (e.g. with buttons or links 208, as shown) in some implementations as shown, or any other such interface, and it may be difficult to find and select a desired application. These interfaces may require significant numbers of additional interactions to launch an application or task. For example, launching a hosted application may require accessing a page in which a folder including the workspace application is stored, accessing the icon folder to open the workspace application, and scrolling through the list to find and select the desired virtual application or desktop for launch. This can be time consuming and inefficient.

Additionally, computing processing resources may be wasted by users launching an incorrect application to perform a task and having to exit the application and launch a new application, and memory usage may be increased if users maintain hundreds of applications on a mobile device with limited memory, even though only a small subset of these applications may be utilized in a given time period.

The systems and methods discussed herein provide for intelligent identification of applications or tasks to be utilized or performed by a user based on a variety of variables that provide relevant context. In some implementations, a hybrid recommendation algorithm may be executed to provide the user with a set of one or more suggested or predicted tasks or applications based on various pieces of contextual data, including location of the user or device, time of day, day of the week, user or application defined calendar events, user activity with applications installed on the device or accessed by the device, universally relevant events (e.g. government or transportation alerts, weather, crucial news events, etc.), the user's past interactions with the recommendation system, and collaborative filtering or aggregation of data from a plurality of users.

The system may be executed at the operating system layer of the computing device in some implementations, and may access data from applications, interact with them, launch applications and create tasks, etc. (in implementations in which the operating system has access to application information, or at least to the segments needed to propose user activity, without compromising encrypted or private data).

In some implementations, applications may be pre-launched or instantiated prior to a user requesting to execute the application, reducing user experience latency and avoiding incorrect application launch. In some implementations, applications that are rarely utilized or will likely not be utilized in an upcoming time period and/or data associated with the applications may be removed from the computing device to reduce memory usage, and may be pre-fetched or downloaded in advance of a time period in which the applications will likely be used. In some implementations, deep linking may be used to pre-launch or suggest specific tasks to be performed within an application (e.g. a link to specific data or pages within a web application associated with the identified task).

In some implementations, a single suggested application or task may be identified and provided to the user, for example via a notification, pop-up message or dialog, banner, etc. The user may select the notification to launch the suggested application. In some implementations, the suggested application may be pre-launched or accessed (e.g. in the background). For example, in one such implementation, a user commuting to work may frequently visit a particular store to purchase breakfast, and in the past, has unlocked their smartphone, selected a payment application, and provided payment via a point-of-sale terminal. Instead, the system may detect the user's location and the time of day and day of week and determine that the user is likely to use the payment application, and may pre-launch the application when the user unlocks their phone (either launching the application directly, or by providing a notification message, the selection of which causes the smartphone to unlock and launch the application). When the user subsequently approaches a subway station as part of their commute, the system may identify the new location and launch a transportation ticketing application.

In some implementations, multiple suggested applications or tasks may be identified and provided to the user, e.g. in a user interface such as a list, or by moving icons on a desktop of the user's device to place suggested applications in a prominent location. For example, during a user's subway commute, they may typically access various applications, such as email, news readers, music applications, games, etc. The system may identify the time of day and the location (or changing location) of the device, and may place these applications in a specified section of their desktop, or may provide a list of the identified applications for easy access. If the user occasionally commutes by driving, the system may identify a different set of suggested applications based on past behavior when driving, and may provide those applications (e.g. a mapping application, etc.). Similarly, upon arriving at work, the system may identify a calendar appointment at a specified time, and responsive to determining that the specified time is current and the user is at a location corresponding to their office or a meeting room, the system may provide access to a meeting application or productivity application to the user automatically when they unlock their device.

Figure 2C:
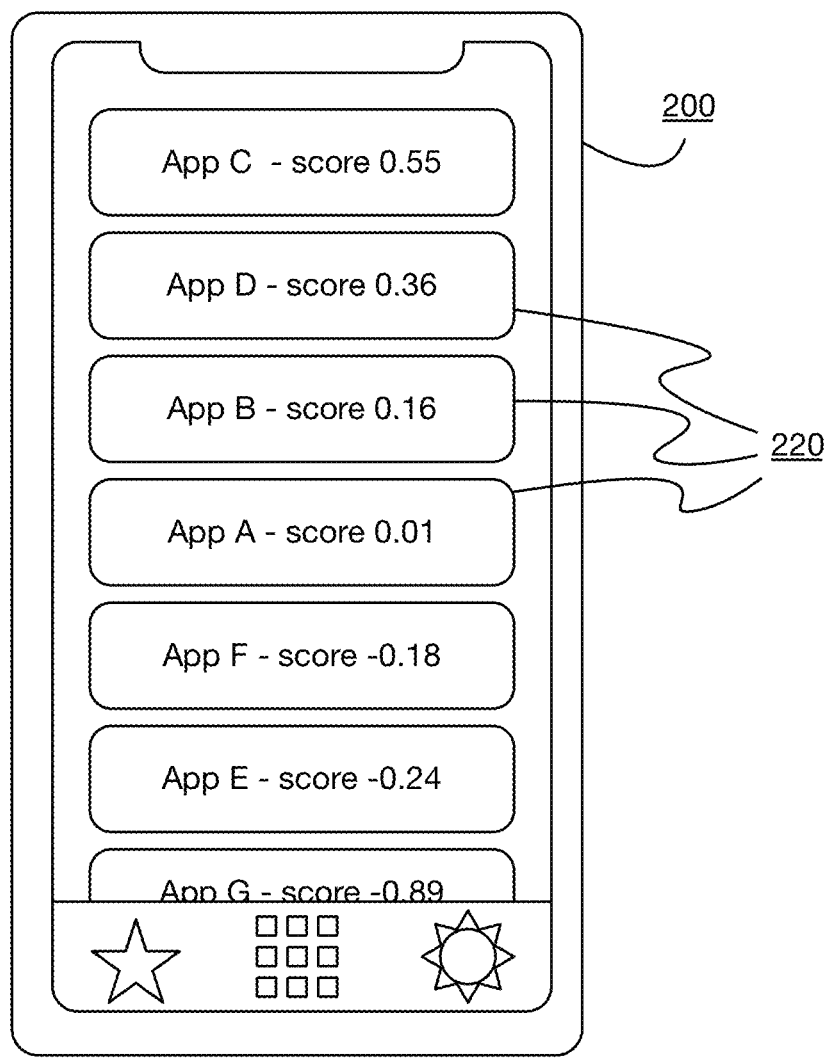
FIG. 2C is an illustration of the list of web applications or hosted applications of FIG. 2B, reordered by score, according to some implementations.

As discussed above, in some implementations, multiple suggested applications may be identified and provided to the user. In some implementations, these applications may be provided in a list in alphabetical order, random order, or chronological order (e.g. most recently accessed to least recently accessed). In another implementation, these applications may be ordered by a score representing how likely the user is to access the application. FIG. 2C is an illustration of the list of web applications or hosted applications of FIG. 2B, reordered by score 220, according to some implementations. As shown, applications may be reordered and may not be in alphabetical order. In many implementations, application scores may be not be shown to the user, but may be maintained by the system and associated with each application.

Accordingly, the systems and methods discussed herein forecast when and where a notification should be pushed to the user or application or task selected and provided to the user based on user behaviors over a period of time (e.g. the past several days or weeks), including but not limited to, application access time distribution, application access geographic location, and interaction with shortcut messages or notifications or lists of applications. In some implementations, in order to avoid frequent false alarms and save limited computational resources in mobile devices, a two phase recommendation algorithm may be used to rank application lists locally according to a data proportion in local history of the device and a score cooling algorithm; and access records may be uploaded to a server for aggregation and clustering with data from other users and devices to forecast when and where a shortcut notification should be send out. Once the application list is changed or reordered, ordering and scores may be aggregated from the cluster level time ranges (e.g. defining periods when a particular application is likely to be accessed) into global level time ranges (e.g. defining ranges of time of which cluster level time ranges are subsets, or during which a variety of applications are likely to be accessed, as opposed to periods in which the user is unlikely to access applications based on past behaviors, such as night time). A notification manager, either locally on the device or on a monitoring server or application server, may be activated during global level time ranges and periodically monitor the device's location to check if a notification message should be sent out for an application or task based on data clustering results from the server. In many implementations, these notifications corresponding to one local or hosted application may be provided at a time during the global level time range. Previous notification messages may be removed when they are out of their particular associated time ranges or locations to avoid flooded messages in notification center. In some implementations, the same techniques can be applied to selecting particular files (e.g. files that are frequently accessed based on a location and/or time or other such data).

Figure 3A:
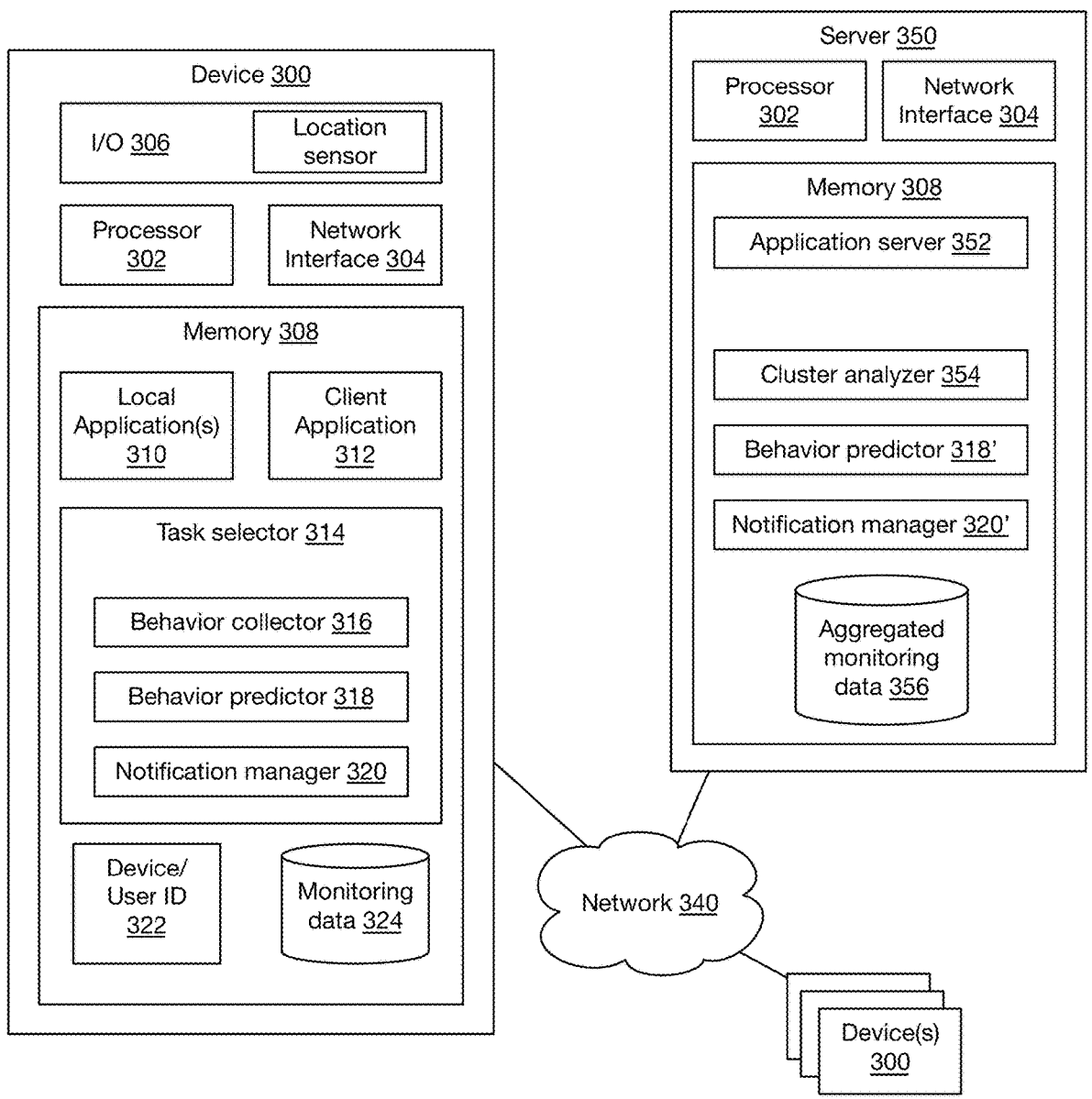
FIG. 3A is a block diagram of an implementation of a system for intelligent application instantiation.

FIG. 3A is a block diagram of a system for intelligent application instantiation, according to some implementations. One or more devices 300 may communicate with a server 350 via a network 340. Network 340 may comprise any type and form of network, including a local area network (LAN), medium or metropolitan area network (MAN), wide area network (WAN) such as the Internet, or a combination of these or other networks. Network 340 may include an Ethernet network, and 802.11 (WiFi) network, a cellular network, a satellite network, a broadband network, or any other type and form of networks. Network 340 may comprise one or more additional devices (not illustrated), including switches, hubs, firewalls, access points, gateways, accelerators, load balancers, or other such devices. Network 340 may utilize any appropriate protocols for communication, including network protocols such as Internet Protocols (IPv4 or IPv6), transport layer protocols such as the Transport Control Protocol (TCP) or User Datagram Protocol (UDP), session later or presentation layer protocols such as the Independent Computing Architecture (ICA) protocol or Remote Desktop Protocol (RDP), and application layer protocols such as the Hypertext Transport Protocol (HTTP) or real time protocols (RTP, RTSP, etc.).

Device 300 may comprise any type and form of computing device executing on behalf of a user, such as a desktop computer, laptop computer, tablet computer, wearable computer, smartphone, embedded or Internet-of-Things (IoT) device, smart automobile, workstation, rackmount computer, or any other type of computing device. Device 300 may sometimes be referred to as a user device, client device, or by other similar terms. Although components are shown internal to device 300, in many implementations, one or more devices may be external to device 300 (e.g. an external display or input device, external memory devices for data storage, etc.).

Device 300 may comprise one or more processors 302, which may comprise single core processors, multi-core processors, virtual processors provided as part of a virtual machine executed by one or more physical machines, or any other type of processor 302. Processors 302 may be referred to as central processing units (CPUs), co-processing units, or by any other such term. In some implementations, device 300 may include additional processors (not illustrated) such as a graphics processing unit or a co-processor on a network interface card.

Device 300 may comprise one or more network interfaces 304 for communicating via a network 340. Network interface 304 may comprise an Ethernet interface, WiFi interface, cable broadband interface, Bluetooth interface, or any other type and form of interface or interfaces. In some implementations, network interface 304 may provide a portion or all of a network stack, and may include packet processing units, flow controllers, or other such elements. Network interface 304 may include hardware, software, or a combination of hardware and software for processing packets and communicating with server 350 and/or client devices 300.

Device 300 may include or communicate with an input or output device 306, such as a display, a touch-screen display, a keyboard, mouse, joystick, or any other such interface. Input/output device 306 may be utilized for providing notifications or user interfaces to a user of the device, and for detecting interactions (e.g. clicking, touching, dragging, etc.) with the notification or user interface. In some implementations, input/output device 306 may comprise a location sensor, such as a global positioning system (GPS) sensor or receiver, or other location sensors (e.g. accelerometers, gyroscopes, compasses, etc.).

Device 300 may comprise or communicate with one or more memory devices 308. Memory devices 308 may be internal to device 300 and/or external (e.g. external hard drives or other storage, network storage devices including cloud storage, etc.). Memory devices 308 may store data and applications for execution or processing by device 300, including an operating system (not illustrated) and one or more local applications 310, which may include email applications, web browsers, productivity applications, games, payment or purchase applications, calendar applications, social networking or media applications, or any other type and form of application. Memory device 308 may also store a client application 312, which may comprise an application including an embedded browser or remote desktop application for accessing web applications or hosted applications, sometimes referred to as remote or virtual applications, provided by a web server, remote desktop server, or application server.

Memory 308 may also store a task selector 314. Task selector 314 may comprise an application, service, server, daemon, routine, or other executable logic for selecting or identifying one or more applications and/or tasks likely to be accessed by a user based on one or more data sources; for providing notifications and/or a list of suggested tasks or applications, or for rearranging icons provided by a desktop interface of an operating system of the device; and in some implementations, for pre-launching or pre-fetching data or applications identified as likely to be accessed by the user prior to selection by a user.

In some implementations, task selector 314 may comprise a behavior collector 316. Behavior collector 316 may comprise an application, service, server, daemon, routine, or other executable logic for collecting information about user interactions with applications, tasks, and/or the device. Behavior collector 316 may read location information provided by a location service of an operating system of the device (e.g. using GPS sensors, WiFi triangulation or geo-location, or other such sensors); time information from a network time source or an operating system of the device; and/or calendar information from a calendar application 310 and/or a mail application or productivity application providing event reminders. In some implementations, behavior collector 316 may collect information about when applications are executed or accessed, along with where the device is, and for how long the application is accessed. For example, in one such implementation, data collected may include one or more of the following (shown along with an inferred behavior pattern):

| App | Launch Time | Location (GPS) | Location | Close Time | Location (GPS) | Behavior Pattern |
|---|---|---|---|---|---|---|
| Payment App | 8:30:01AM, Mon 8:31:00AM, Tue 8:32:56AM, Wed . . . | 32.03680, 118.84974 32.03680, 118.84974 32.03680, 118.84974 . . . | Cafe | 8:30:11AM, Mon 8:31:10AM, Tue 8:33:06AM, Wed . . . | 32.03680, 118.84974 32.03680, 118.84974 32.03680, 118.84974 . . . | Payment app is typically launched around 8:30-8:35 PM in working day and the location is around 32.036807, 118.849749 |
| Transport app | 8:40:21AM, Mon 8:41:30AM, Tue 8:42:22AM, Wed . . . | 32.03761, 118.84839 32.03761, 118.84839 32.03761, 118.84839 . . . | Subway station | 8:40:31AM, Mon 8:41:40AM, Tue 8:42:42AM, Wed . . . | 32.03761, 118.84839 32.037610, 118.84839 32.037610, 118.84839 . . . | Transport app is typically launched around 8:40-8:45 PM in working day and the location is around 32.037610, 118.848394 |
| Social media app | 9:06:01AM, Mon 9:15:02AM, Tue 9:24:11AM, Wed 9:35:12AM, Thu . . . | 32.03734, 118.84830 32.04023, 118.83532 32.03919, 118.81969 32.04012, 118.80575 . . . | The location line from one subway station to a second subway station | 9:09:01AM, Mon 9:21:02AM, Tue 9:35:11AM, Wed 9:46:12AM, Thu . . . | 32.037347, 118.84830 32.040239, 118.83532 32.039193, 118.81969 32.040121, 118.80575 . . . | Social media app is typically launched around 9:05-9:50 PM in working day and the location is around 32.036807, 118.849749 |
| Meeting app | 10:01:00AM, Tue 09:59:00AM, Tue 09:59:11AM, Tue . . . | 31.91186, 118.81182 31.91186, 118.81182 31.91186, 118.81182 . . . | Office | 10:31:00AM, Tue 09:30:01AM, Tue 09:51:11AM, Tue . . . | 31.911866, 118.81182 31.911866, 118.81182 31.911866, 118.81182 . . . | Meeting app is typically launched around 9:59-10:00 PM on every Tuesday and the location is around 31.911866, 118.811827 |

-continued

| App | Launch Time | Location (GPS) | Location | Close Time | Location (GPS) | Behavior Pattern |
|---|---|---|---|---|---|---|
| Transport app | 6:15:01PM, Mon<br>6:14:02PM, Tue<br>6:16:03PM, Wed<br>... | 31.91603, 118.82121<br>31.91603, 118.82121<br>31.91603, 118.82121<br>... | Subway station | 6:15:05PM, Mon<br>6:14:07PM, Tue<br>6:16:10PM, Wed<br>... | 31.916037, 118.82121<br>31.916037, 118.82121<br>31.916037, 118.82121<br>... | Transport app is typically launched around 6:14-6:16 PM in working day and the location is around 31.916037, 118.821215 |

The data collected by behavior collector 316 may be stored in a monitoring data database 324, which may comprise a flat file, array, or any other data structure, which may be stored in memory device 308.

Task selector 314 may also comprise a behavior predictor 318. Behavior predictor 318 may comprise an application, service, server, daemon, routine, or other executable logic for predicting one or more applications and/or tasks for access or execution by a user of the device. The behavior predictor 318 may collect current user environment information including time and location of the device, and may compare the current environment information to historical data 324. Based on the comparison, it may direct task selector 314 to pre-launch or access an application or task, rearrange application icons on a desktop, and/or direct notification manager 320 to generate one or more notifications with suggested tasks and/or applications.

Task selector 314 may comprise a notification manager 320, which may comprise an application, service, server, daemon, routine or other executable logic for generating notifications or alerts with links to suggested applications or tasks. Such applications may be local or remote (e.g. hosted or web applications), and may include parameters for access by the applications (e.g. links to internal web pages of a web application, files to open within an application, etc.). Notifications may be generated via an application program interface (API) of an operating system of the device, provided as pop-up windows within an application, or otherwise provided to the user.

In some implementations, the task selector 314 may utilize a hybrid recommender system, based on a combination of collaborative and content-based filtering, to identify activity a user is likely to or should perform (given circumstances) at any given time. As used herein, content-based filtering refers to methods that take into account descriptions of items, their properties and information of the user's preferences. The pieces of data available are used to build a profile on the user. The profile may comprise a model of the user's preference, as well as a history of the user's interaction with the recommender system itself (e.g. accepting or rejecting recommendations).

Data from multiple sources collected within the device may be used to filter or generate recommendations on the basis of content. In case any piece of data or a source is unavailable, the system may rely on the rest. For example, when a user just starts using the system, the task selector may not have historical data of the user using the device or their interaction with the recommendation system. As discussed above, the data sources may include (but are not limited to):

a. Location of the user;
b. Time of the day;
c. User and user-app defined calendar events;
d. User's activity on the applications installed on the device;
e. Universally relevant events such as government alerts, weather, crucial news; and
f. User's interaction with the recommendation system in the past.

In some implementations, generic content-based filtering may be unable to learn user preferences from user actions on one content type or data source and use them in other places. To accommodate this, in some implementations, the results of collaborative filtering may be used as an additional input of the content-based filtering. As used herein, collaborative filtering refers to aggregated analysis of behaviors from a large plurality of users. Collaborative filtering may be based on the assumption that people who have agreed in the past will agree in the future. By grouping the user with like-minded people, the system may use the other users' activity as an indicator of what the local user may appreciate.

For example, in some implementations, using the parameters identified in the content-based filtering, the system may use a machine learning technique, such as a k-nearest neighbor (k-NN) approach to extract a similarity score. This similarity score is used as another input in the content-based filtering system. In other implementations, other machine learning models may be utilized, including logistic regression, neural networks, or other such models.

This similarity core and other content-based filtering input data may be used to create a profile of the user and his/her tendencies and preferences in the form of weighted vectors, where weights themselves are variable and dynamically updated. The weights keep changing themselves based on user's activity. Once the system has generated a series of weighted vectors, the system may use weighted Bayesian classification to estimate the probability of the user liking the suggestion, referred to as a recommendation score, confidence score, or by similar terms. As discussed above, in many implementations, the recommended items may be tasks the user will perform using local or hosted applications. Accordingly, the system now has a small set of activities that the user is likely to perform or should perform given the circumstances. N items (N defined by the application level implementation) identified with the highest possible scores may be presented to the user (e.g. a single item in some implementations, or multiple items in an ordered or ranked list, in some implementations). This list of suggested items can be refreshed and recalculated every time a new value for any of the previously defined triggers comes into play, or on a periodic basis.

Figure 3B:
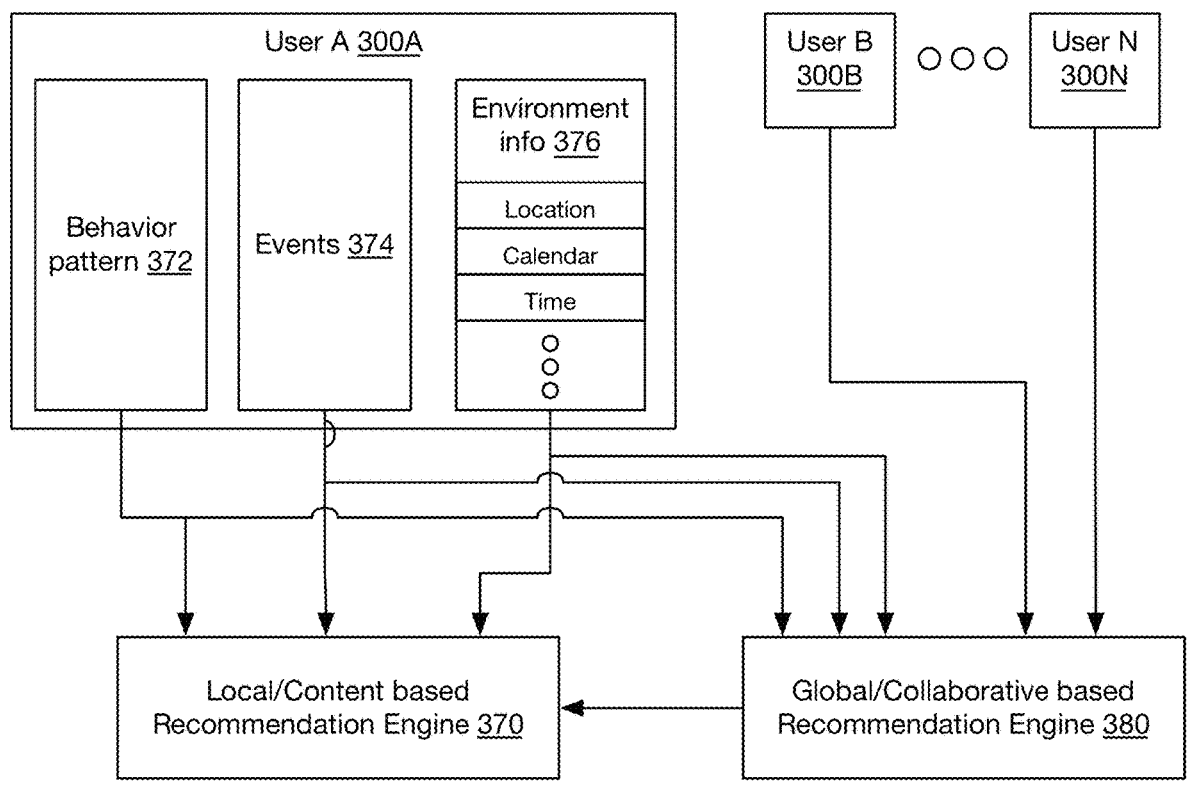
FIG. 3B is another block diagram of an implementation of a system for intelligent application instantiation.

Referring briefly to FIG. 3B, illustrated is a block diagram of a system for intelligent application instantiation using local/content based recommendations 370 and global/collaborative based recommendations 380. Recommendations 370 may be generated by a behavior predictor 318 and/or task selector 314, and accordingly, task selector 314 and/or behavior predictor 318 may be considered to comprise a local/content based recommendation engine 370. As shown and as discussed above, the local/content based recommendations 370 may be generated based off behavior patterns of a user of the device 372, such as commonly accessed applications at identified times and/or locations. The recommendations 370 may also be based off events 374, such as information retrieved from a calendar application, a news application, a transportation application (e.g. identifying traffic patterns or delays, etc.). The recommendations may further be selected based on environment information of the device 376, such as a current time, date, calendar information (e.g. upcoming or current event), as well as a location of the device.

As discussed above, information about a first user or device 300A may be aggregated with information about other users and/or devices 300B-300N, such as other behavioral patterns 372, by a global/collaborative based recommendation engine 380, which may be part of a cluster analyzer 354. As discussed above, the global/collaborative based recommendation engine 380 may compare monitoring data 324 of a first device with monitoring data 324 of other devices to classify devices into similar groups, e.g. based on a similarity score determined via a k-NN analysis. The similar groups may be associated with or represented by one or more weighted vectors representing a profile of a user of the group. The weighted vectors may be provided by the global/collaborative based recommendation engine 380 and/or cluster analyzer 354 to a task selector 314 of a device 300, which may use the vectors with Bayesian classification and a set of applications or tasks and current environment data 376 to generate probabilities for each application or task to be performed, the probabilities representing a likelihood that the user will select to perform or access the corresponding application or task.

Accordingly, the systems and methods discussed herein do not just provide the user with a set of recommended tasks, but also a convenient way to perform the tasks, and may pre-fetch data and/or pre-launch applications to reduce apparent latency during launching and increase efficiency. In many such implementations, the concerned app may be executed or instantiated in a state that permits the user to take action with minimal action, such as by launching in the background. As discussed above, deep links may be utilized to allow the user to directly access pages of a web application or data within an application. Deep links may comprise a uniform resource indicator (URI) associated with a specific location within a mobile application, a data set to be utilized by an application, an operating state of an application, etc. Once a task is identified for the user, the corresponding application may be launched or accessed in the background and data accessed via a deep link created for the action, permitting the user to select the app and encounter the state that allows the recommended action.

In some implementations, a quick-to-access menu listing the applications that have relevant recommended tasks at that moment may be provided to the user. The menu may be constantly updated as the recommendations change, based on changes in time, location, selections by the user, etc. This menu can be implemented in any form, such as on an application level, for example, as a small n-item overlay similar to assistive touch available on Apple devices; or as a small menu that slides into view on a screen based on a gesture. In other implementations, a list of n applications with the name and icon, along with a small description of the suggested activity, may be provided. This way multiple suggestions to the same activity (e.g. different deep links or URIs to different data or states, but associated with the same application) may be possible without the user being confused.

In a first example, and as discussed above, the system may recognize that a user commutes to and from work every day at set hours (e.g. location A to B at 9 AM and vice versa at 5 PM). Assessing user and community behavior the system can suggest a ride-sharing application, deep linked to a state that determines A and B as pick-up and drop. The user would then just have press 'Book' or 'Request Ride' or a corresponding command. Conventionally, the task could have required dozens of taps or interactions, typing and selecting pick up and drop locations before the user can reach a state where he/she can book the ride. With implementations of systems and methods discussed herein, it may be selected with a single tap.

In a second example, the system may recognize that the user is at a restaurant near conventional lunch timings, the user can then be suggested an app such as a reservation or review application, with the restaurant page deep-linked (e.g. reviews or a menu) that permit the user to identify whether they want to eat there. Secondly, if the user's location is then subsequently identified to be within the property, they can be shown an offer or coupon page within the application.

Returning to FIG. 3A, to aggregate user behavior and data to generate collaborative filtering profiles and weights, monitoring data 324 may be provided over network 340 to a server 350 for aggregation. In some implementations, a device and/or user identifier 322 may be provided with the data to associate the data with a particular device or user. The device or user identifier 322 may comprise an alphanumeric string, a media access control (MAC) identifier, a user name, an account name, or any other type and form of unique or device- or user-specific identifier.

Server 350 may comprise any type and form of computing device or devices, including a rackmount server, workstation, desktop server, or other such device. Server 350 may comprise a plurality of servers, such as a server farm or cluster, or may comprise one or more virtual computing devices executed by one or more physical computing devices, such as a server cloud. Server 350 may comprise one or more processors 302, network interfaces, and memory devices 308. In some implementations, server 350 may include I/O devices 306, while in other implementations, server 350 may be "headless" or lacking such devices.

In some implementations, server 350 may execute an application server 352. Application server 352 may comprise a remote desktop server or virtual machine server, a web server, or any other type of application server for providing access to hosted applications to one or more client devices 300. In some implementations, one or more hosted applications may be provided by additional servers 350, such as via servers of a server cloud or other such group of computing devices.

Server 350 may execute a cluster analyzer 354. Cluster analyzer 354 may comprise an application, server, service, daemon, routine, or other executable logic for receiving monitoring data 324 from a plurality of client devices 300, and generating aggregated monitoring data 356. As discussed above, in some implementations, the aggregated monitoring data 356 may comprise similarity scores between profiles of users or devices based on monitoring data 324 received from each device, calculated via a k-NN machine learning model. Cluster analyzer 354 may also generate a set of weighted vectors corresponding to a profile of a user or client device, based on the user's activity and activities of other users.

As discussed above, the aggregated profile or weighted vectors associated with a user of a device may, in some implementations, be provided to the device via network 340 by server 350. The behavior predictor 318 of the user device may use the weighted vectors and Bayesian classification based on current environmental data (e.g. time of day, day of week, location, other selected applications, etc.) to determine, for each application or task identified in the aggregated profile or local profile data, a likelihood or probability of the user accessing or performing the corresponding application or task.

In some implementations, server 350 may also execute a behavior predictor 318' and/or notification manager 320'. For example, in some implementations, monitoring data 324 may be provided to server 350 from a client device, and the server may predict one or more likely applications or tasks that the user of the client device may wish to perform. Notification manager 320' may generate and push notifications to the client device 300 via network 340, based on a current time and location of the device and the predicted behavior and cluster information as discussed above.

Figure 4A:
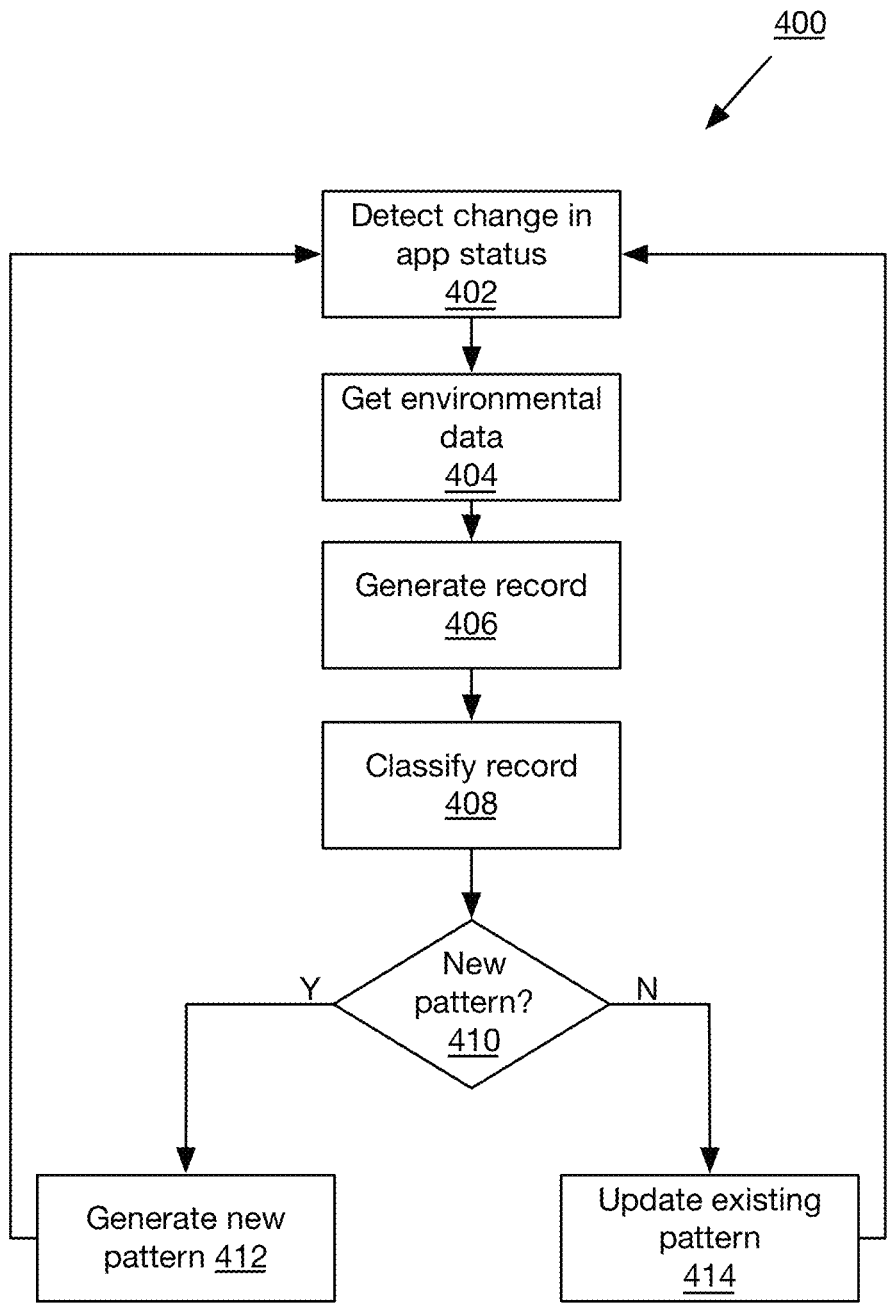
FIG. 4A is a flow chart of a method for collection of historical behavior data and patterns, according to some implementations.

FIG. 4A is a flow chart of a method 400 for collection of historical behavior data and patterns, according to some implementations. In brief overview, at step 402, a task selector of a device or behavior collector of the device may detect a change in the status of an application. At step 404, the task selector or behavior collector may gather environmental information at the time of status change of the application. At step 406, the task selector or behavior collector may generate a record of the status change and environmental data. At step 408, the task selector or behavior collector may classify the record. At step 410, the task selector or behavior collector may determine if the record corresponds to a new pattern or an existing pattern. If the pattern is new, then at step 412, the task selector or behavior collector may generate a new pattern. Conversely, if the pattern is not new, then at step 414, the task selector or behavior collector may update the existing corresponding pattern.

Still referring to FIG. 4A and in more detail, at step 402, the task selector or behavior collector may determine a change in the status of an application. The status may correspond to the application being executed, or being terminated after execution in some implementations (e.g. an application start or launch status and an application stop or termination status). Application execution may be determined via monitoring of executing processes, in some implementations (e.g. parsing a task list or process list for application names). In other implementations, the status may correspond to access to particular data, such as a page of a web application or data file accessed by the application. In some implementations, the task selector or behavior collector may identify the change by monitoring HTTP requests and responses to and from a web application by an embedded browser, by monitoring data file read or write operations by an operating system, or any other such methods.

At step 404, the task selector or behavior collector may gather environmental information at the time of status change of the application. The environmental information may include a start time or end time of the status change of the application (e.g. based on a present time when the change occurs), a location of the device (e.g. gathered from location services of an operating system of the device, read from a GPS sensor or geolocation service, etc.), an active calendar appointment or meeting or similar event, and/or any other such information as discussed above.

At step 406, the task selector or behavior collector may generate a record of the status change and environmental data. The record may comprise an identification of the application or task, an identification of the status change, an identification of the time, an identification of the device location, and/or any other such information. The record may comprise fields in an array or database entry, concatenated values, parameter-value pairs, XML or JSON data, or any other such information.

At step 408, the task selector or behavior collector may classify the record. The record may be classified or grouped with other records having similar application identifiers, similar locations, similar times of day, etc. For example, in the example table shown above, entries in each row include a start and end time and start and end locations for accessing an application. An application start record may be classified and grouped with a similar application end record in order to create a complete entry of application start and finish. Similarly, as shown in the example table, an application may be associated with start times on different days, such as access to the transportation application during a weekday commute. A status change event may be classified as corresponding to an existing record based on having variables that change less than a threshold value. For example, if a start time of an application on a first day and second day are within a predetermined time period (e.g. 10 minutes), the records may be classified together. Similarly, if location information for start times of the application are within a small range (e.g. about 10 meters, or one ten thousandth of a degree longitude or latitude), the records may be classified together. In some implementations, records may be classified together only if both the time and corresponding location are both within less than a threshold difference of the existing record (e.g. within 10 minutes and within 0.0001 decimal degrees). In other implementations, other information may be required to match within a threshold difference to classify a record as corresponding to an existing record.

At step 410, the task selector or behavior collector may determine if the record corresponds to a new pattern or an existing pattern. If the record cannot be classified as matching any existing record at step 408, then the record may be considered to correspond to a new pattern.

If the pattern is new, then at step 412, the task selector or behavior collector may generate a new pattern for recordation in the array or database of behavioral data. The new pattern may include additional fields for related events (e.g. a pattern created for a record corresponding to an application launch event may also include fields for a corresponding application termination event). This allows for a pattern to be created and subsequently matched to an event corresponding to the event for which the pattern was created.

If the pattern is not new, then at step 414, the task selector or behavior collector may update the existing corresponding pattern. Updating the pattern may comprise adding the environmental data to the pattern, and/or averaging the environmental data with existing environmental data in the pattern. For example, if the pattern was created from a previous application start event on a Monday at 9:00:00 AM; and a new application start event is identified on a following Monday at 9:01:00 AM, the pattern may be updated with a range (e.g. 9:00:00-9:01:00 AM), or may be updated with an average value (e.g. 9:00:30 AM). This ensures that the pattern will be dynamically updated to represent corresponding events.

Process 400 may be repeated iteratively for each additional detected change in an application status, including launch, termination, access to data, writing of data, etc.

Figure 4B:
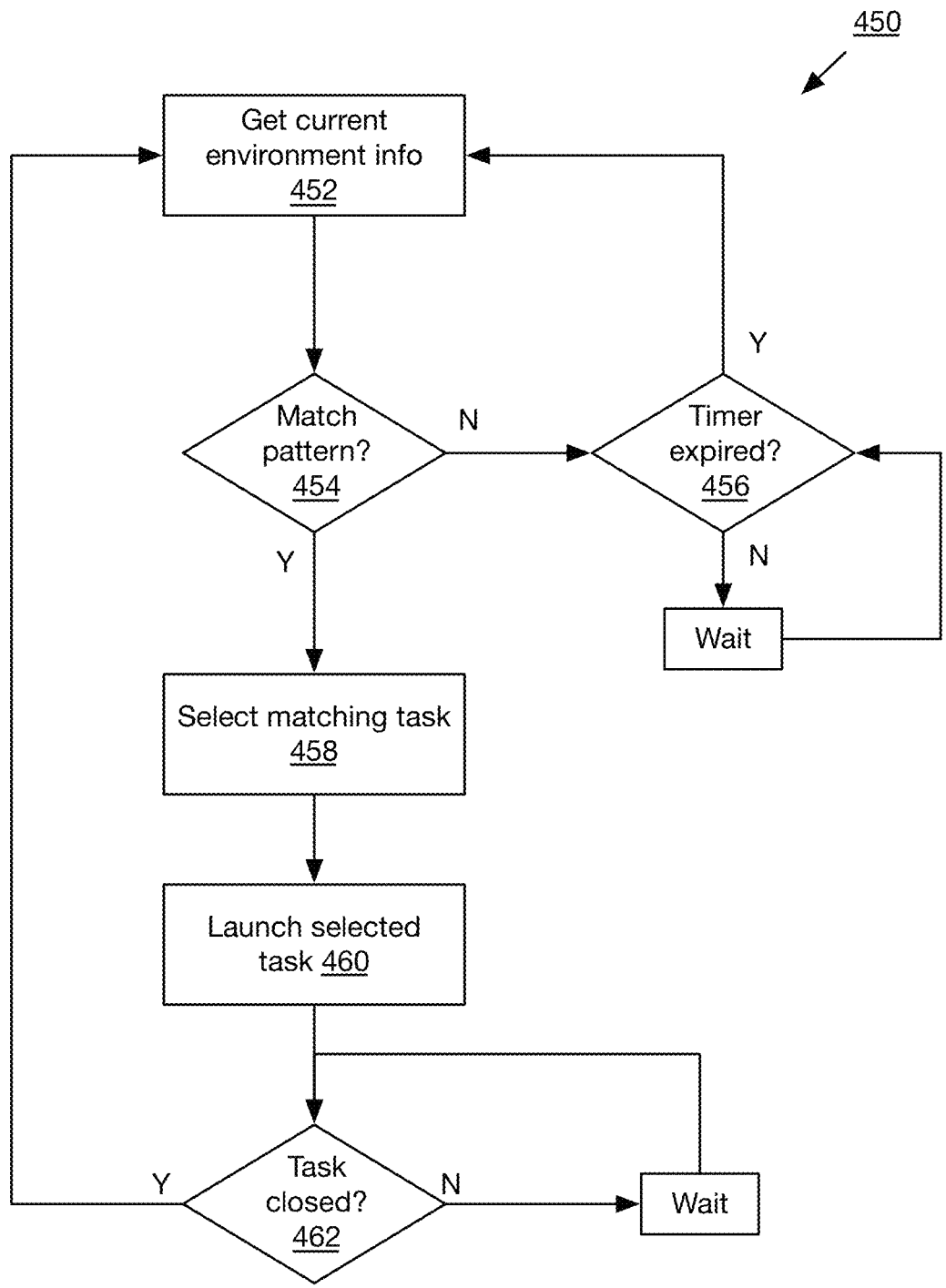
FIG. 4B is a flow chart of a method for intelligent instantiation of applications, according to some implementations.

FIG. 4B is a flow chart of a method 450 for intelligent instantiation of applications, according to some implementations. In brief overview, at step 452, a task selector or behavior predictor of a device may get current environmental information. At step 454, the task selector or behavior predictor may determine whether the current environmental information matches an existing pattern. If not, at step 456, the task selector or behavior predictor may determine if a monitoring timer has expired. If not, the task selector or behavior predictor may wait a time period and repeat step 456. Once the timer has expired, then steps 452-454 may be repeated. If a pattern matches the current environmental information, then at step 458, the task selector or behavior predictor may select the task and/or application identified by the pattern. At step 460, the task selector or behavior predictor may launch or execute the corresponding task or application. At step 462, the task selector or behavior predictor may determine if the task is closed or the application terminated. If not, then the task selector or behavior predictor may wait and repeat step 462. Once the task is closed or the application terminated, then steps 452-462 may be repeated for subsequent environmental information and/or applications or tasks.

Still referring to FIG. 4B and in more detail, at step 452, a task selector or behavior predictor of a device may get current environmental information. The environmental information may include a current time (e.g. retrieved from a network time source or from an operating system of the device), a location of the device (e.g. gathered from location services of an operating system of the device, read from a GPS sensor or geolocation service, etc.), an active calendar appointment or meeting or similar event, and/or any other such information as discussed above.

At step 454, the task selector or behavior predictor may determine whether the current environmental information matches an existing pattern. In some implementations, the task selector or behavior predictor may compare a current time to a range of times associated with a pattern, or to an average time and a difference threshold (e.g. before or after the average time by ten minutes, or any other such value). Similarly, the task selector or behavior predictor may compare a current location to a location of a pattern (e.g. a coordinate range, or an average coordinate plus a difference threshold, such as plus or minus 0.0001 decimal degrees, or within a geofenced location or similar comparison). In some implementations, the task selector or behavior predictor may identify any upcoming or active meetings or appointments, and compare the meeting or appointment to the patterns. Patterns may be compared iteratively via any suitable means (e.g. filtering patterns that do not match a current time, then filtering any remaining patterns that do not match a current location, etc.).

In many implementations, multiple patterns may partially match the environmental information. In some implementations, a best matching pattern may be selected. In other implementations, a plurality of partially matching patterns may be selected and ranked, based on how closely they match the current environmental information (e.g. a pattern matching a time and location may be ranked higher than a pattern matching only a location).

If the current environmental information does not match an existing pattern, at step 456, the task selector or behavior predictor may determine if a monitoring timer has expired. If not, the task selector or behavior predictor may wait a time period, such as five minutes, ten minutes, half an hour, one hour, or any other such interval, and repeat step 456. Once the timer has expired, then steps 452-454 may be repeated. The timer may reduce processing requirements in some implementations by reducing the rate of monitoring and pattern matching. In other implementations, step 456 may be skipped, and environmental data may be constantly monitored.

If a pattern matches the current environmental information, then at step 458, the task selector or behavior predictor may select the task and/or application identified by the pattern. As discussed above, in some implementations, a pattern may be associated with an application, while in other implementations, a pattern may be associated with a specific task (e.g. accessing a weekly time card in a productivity application or web application, listening to an exercise music playlist in a media application, etc.). In such instances, a URI corresponding to the task (e.g. a web page within a web application, a playlist or other data file to be accessed by an application, etc.) may be identified.

At step 460, in some implementations, the task selector or behavior predictor may launch the selected task. Launching the task may comprise launching an application, launching a client application with an embedded browser and navigating to a web application or page corresponding to a URI, accessing a data file in an application, etc. In many implementations, the task may be launched in the background (e.g. not visible or displayed to a user) and a notification or other message may be provided to the user identifying the task as suggested. The user may select the notification or otherwise confirm to access the pre-launched task, at which point the executing task may be brought to the foreground or rendered. This may reduce user experience latency by not requiring the user to wait while the application is launched or data is retrieved and rendered. If the user does not confirm to launch the task or ignores the notification for a predetermined time period, the task may be terminated, and the method may return to step 452.

At step 462, the task selector or behavior predictor may determine if the task is closed or the application terminated. If not, then the task selector or behavior predictor may wait and repeat step 462 in some implementations. The task may be closed or terminated by the user, e.g., upon completion of the task or if the user runs out of time to perform the task, arrives at a destination, etc. The task selector or behavior predictor may wait until the task is complete, repeating step 462 periodically (e.g. every second, every minute, every five minutes, etc.), monitoring for a status change in execution of the related application as discussed above in connection with FIG. 4A.

Once the task is closed or the application terminated, then steps 452-462 may be repeated for subsequent environmental information and/or applications or tasks. Although shown for a single task, in many implementations, steps 452-462 may be executed in parallel for a plurality of tasks. For example, if multiple patterns match current environmental information, each corresponding to a different application or task, then at step 460 in some implementations, multiple applications may be executed or URIs accessed. Each pre-launched application or task may be loaded in the background, and a list of tasks or applications provided to the user for selection. Accordingly, the user may be provided with a plurality of options from which to select a suggested task.

In some implementations, cluster analysis and local activity logging may be utilized as part of aggregation of behavior data from a plurality of users. Specifically, in some implementations, the system may monitor access by users to local or hosted or virtual applications, and record application or task access activities in a local cache of the client. The access activities may be periodically uploaded to a server for cluster analysis with access activities of other client devices.

In some implementations, applications or tasks accessed by a user of a device may be ranked according to "hotness" or a value representing how often and how recently applications were accessed. This value may be analogized to temperature (with more active or recently accessed applications being "hot" and less active or recently accessed applications being "cold"). Sticking with this analogy, a cooling function may be applied to the values to dynamically adjust rankings, such as Newton's law of cooling, based on proportions of access to each application relative to total access of applications over a period of time, such as a day, two days, a week, or any other such value. In combination with application level clustering, this may allow for dynamically forecasting or predicting times and locations a user is likely to access an application or task, based on user access behaviors over a period of time. A task selector on the client device or server may continue monitoring the device location during global level time ranges (e.g. aggregated time periods during which access to applications is likely), and the client may retrieve application level clustering results to determine if a notification should be provided or a list of applications or tasks reordered.

When a user accesses a local, hosted, or virtual application via a computing device, the task selector may generate a record and store a copy of the record in a behavior database or local cache. In some implementations, the record may include a unique name of the application and/or task, a URI, a device location including latitude and longitude, an access time, and a device identifier, or any other such information. In some implementations, to reduce storage requirements and speed client-side processing, only a subset of records may be cached or stored locally (e.g. records for the previous day, two days, one week, etc.). Prior data may be uploaded to a server for aggregation periodically (e.g. at midnight). In some implementations, if the user again accesses the local, hosted, or virtual application responsive to a suggestion from the task selector (e.g. via a notification message or ranked list of suggested applications or tasks), a corresponding access record may be duplicated or a similar access record may be generated (or a count value incremented) in its neighborhood for reinforcement to improve forecast accuracy.

Newton's law of cooling states that the rate of heat loss of a body is directly proportional to the difference in the temperatures between the body and its surroundings. It is calculated by the formula $T=T_0 e^{-a(t-t_0)}$ where T is current temperature, $T_0$ is a starting temperature or previous temperature, a is a cooling rate, and $(t-t_0)$ is the elapsed time since the previous temperature measurement (i.e. the measurement of $T_0$). Applying this to ranking of applications or tasks, each new task or application has an initial score or "temperature" reflecting its hotness or how recently and how often the task or application is accessed, and, providing further access is not made, the score or "temperature" gradually drops over time.

In some implementations, applications may be ranked by hotness or score, which may be based on daily hit frequency. The hotness or score may be calculated based on a cooling rate (e.g., as used in Newton's law of cooling), which may represent how quickly an application becomes hot or cool; and the proportion of application access frequency relative to frequency of access to all applications (or a subset of all applications). The formula above may be rewritten as $LF=LF_0 e^{-a}$, where LF is an application access frequency or number of accesses of an application during a current time period and $LF_0$ is an application access frequency or number of accesses of an application during a previous time period. The cooling rate can be calculated by the access frequency based on the equivalent formula $a=-\ln[(LF+1)/(LF_0+1)]$ (the additional one is added to both LF and $LF_0$ in order to avoid a zero denominator). The range of cooling rate is $(-\infty, +\infty)$ in theory, but may be truncated or normalized in a limited range (e.g. $(-5, 5)$) in many implementations. In such implementations, a cooling rate of 5 may indicate that an application access frequency for a previous time period is 150 times that of an application access frequency for a current time period. Thus, the smaller the cooling rate is, the hotter an app becomes or stays.

One implementation of a normalization cooling rate formula is shown below:

$$a = \begin{cases} -1; & \text{when } (LF+1)/(LF_0+1) \geq 148 \\ -\ln[(LF+1)/(LF_0+1)]/5 & \\ -1; & \text{when } (LF+1)/(LF_0+1) \leq 1/148 \end{cases}$$

Example values for a hypothetical implementation are illustrated below in Table 1, showing cooling rate for hotness scoring based on application access frequencies:

TABLE 1

| Application | Launch Frequency | | Cooling Rate - Normalization |
|---|---|---|---|
| | Previous Day | Current Day | |
| Mapping application | 0 | 99 | −0.92 |
| Email application | 1 | 10 | −0.34 |
| Meeting application | 4 | 2 | 0.10 |
| Payment application | 18 | 27 | −0.08 |
| Social networking application | 30 | 29 | 0.01 |
| Notepad application | 4 | 8 | −0.12 |
| Calculator application | 100 | 1 | 0.78 |

In the example illustrated, the mapping application and email application are increasing in hotness or score, while the calculator application has cooled significantly due to a bigger decrease in access frequency between the prior time period and present time period. In many implementations, the cooling rate algorithm may be more sensitive to gradients or relative differences than absolute differences. For example, while the email application and payment application have the same delta change in access frequency between the time periods (e.g. an increase of 9), the email application is scored hotter (or has a lower cooling rate), due to the relative differences (e.g. a 1000% increase for the email application compared to a 150% increase for the payment application).

In some implementations, applications may be identified as "hot" responsive to having an associated normalized cooling rate less than a threshold value (e.g. −0.1). For example and using this threshold value, the algorithm may identify the mapping application, email application, and notepad application as "hot". However, the payment application and social networking application have higher access frequencies, but are not identified as hot due to their lower gradients (e.g. almost flat or slightly downwards). In order to balance gradient changes and momentum, in some implementations, normalization cooling rate and application access proportion relative to the total access numbers for applications in the time period may be used to jointly determine the hotness an $i^{th}$ application based on the following formula:

$$\text{Score}(i) = \beta \frac{\sum_{t=0}^{1} a_{it}}{\sum_{t=0}^{1} \sum_{j=0}^{n} a_{jt}} - (1-\beta)a;$$

Where $\beta$ is the weight for access proportion for an application; $\alpha_{it}$ is the total access frequency for a specific application for a time period; and $a_{jt}$ is the total access frequency for applications or tasks over the time period.

For example, setting $\beta$ as 0.6 as an experimental value to offer more weight for access proportions, and recalculating the rank scores for local or virtual applications yields the results in Table 2:

TABLE 2

| Application | App Launch Frequency | | Cooling Rate - Normalization | Proportion - Normalization | Rank Score by Hotness |
|---|---|---|---|---|---|
| | Previous Day | Current Day | | | |
| Mapping application | 0 | 99 | −0.92 | 0.30 | 0.55 |
| Email application | 1 | 10 | −0.34 | 0.03 | 0.16 |
| Meeting application | 4 | 2 | 0.10 | 0.02 | −0.03 |
| Payment application | 18 | 27 | −0.08 | 0.14 | 0.11 |
| Social networking application | 30 | 29 | 0.01 | 0.18 | 0.10 |
| Notepad application | 4 | 8 | −0.12 | 0.04 | 0.07 |
| Calculator application | 100 | 1 | 0.78 | 0.30 | −0.13 |

As shown in Table 2, ranking applications according to scores as defined above provides a more accurate measure of application hotness or likelihood to be accessed by a user, with hotter applications having higher positive scores. In the example illustrated, the mapping application is very hot, having many recent launches relative to both its own prior access rate and the total application access rate. Conversely, the meeting application has few recent launches and the launches comprise a small proportion of the total, yielding a low hotness score. The email application has a hotness score that is higher than that of the payment application due to its recent increase in launches, but the score difference is not as extreme as the normalized cooling rates would indicate, due to the larger proportion of application accesses made up by the payment application.

Hyper-parameter $\beta$ may be selected (e.g. by a user or administrator of the system) to balance the effects of access proportion and gradient change over the time period. As the example of Table 2 shows, the social networking application has fewer recent launches or accesses compared to the previous day, and accordingly, the social networking application is cooling, as shown by the positive cooling rate. On the other hand, due to its large proportion of launches over the total time period, it is identified as a hot application. The final hotness score balances these interim scores, providing a tradeoff between normalized cooling rating and access proportion. The final hotness score or rank is typically positive for a hot application. Accordingly, in the example illustrated, the payment application and social networking application that would be missed by considering cooling rating alone are added back to the set of hot applications as expected.

In some implementations, the rank score may be recalculated periodically, such as hourly, daily, or any other period. In other implementations, the rank score may be recalculated after a predetermined number n of application launches or accesses. In still other implementations, both periodic and access-based recalculations may be performed (this may be particularly beneficial in situations in which hotness increases rapidly due to many accesses in a short time period, and then cools rapidly due to long periods with no accesses). A small counter n may trigger frequent and unnecessary application recalculation due to a substantially unchanged hot application list, while a large counter n may lag behind changes in access rates. In some implementations, a moderate number such as 20 or 30 may be used. The application detection and ranking algorithms may be refreshed each periodic interval (e.g. daily), using access data over the most recent two time periods. However, in many implementations, other values may be used for the counter n and time interval.

As discussed above, access behaviors and locally calculated or per-device rankings may be aggregated with other devices having similar access behaviors to provide collaborative filtering and ranking. In some implementations, a data clustering algorithm may be used to differentiate between clusters of devices based on a vector distance between samples. This may require a large amount of computational resources, especially for a huge amount of data samples from a large number of devices, with higher dimensional vectors. Accordingly, to reduce processing and battery requirements on mobile devices, in many implementations, a server (e.g. cloud server or cluster of computing devices) may aggregate data from multiple clients and perform clustering calculations. Once clusters are identified, dimension reduced vectors may be provided to the client devices for local calculations.

As discussed above, applications may be ranked or scored for hotness based on application launch or access frequency over a recent time period, to forecast or predict when and where a user will want to access an application, based on access records over a period of time. The access records may be described by an n-dimensional feature vector comprising access time, latitude and longitude (e.g. "9:09 AM, 39° 52'48"N, 116° 24'20"E"). Other features may be used for additional dimensions (e.g. page or task within an application, duration of access, an active meeting or time until a next meeting, etc.). Hit records are distributed in the n-dimensional space, and a vector distance may be calculated to describe how closely any two instances are located.

Figure 5A:
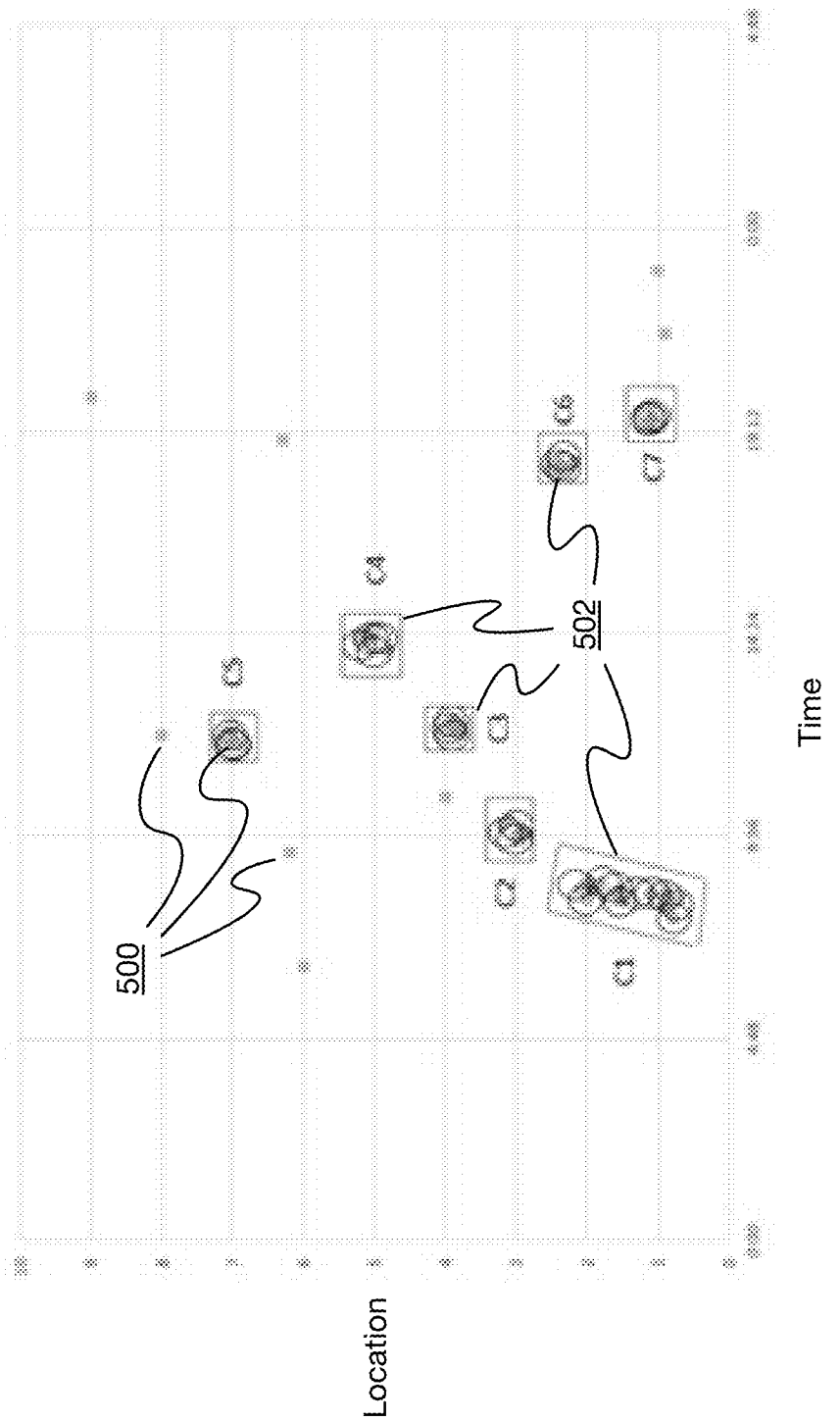
FIG. 5A is an example scatter chart of location over time of application accesses, according to some implementations.

FIG. 5A is an example scatter chart of location over time of application accesses, according to some implementations. For ease of illustration so that only two dimensions are needed, the two dimensions of latitude and longitude have been encoded into a unique location value in the y-axis, and application access time is illustrated in the x-axis via a vector dimension reduction. Hit records or access records for an application are shown as dots 500 in the scatter chart of FIG. 5A. Records 500 may be grouped into clusters 502 via a clustering algorithm, such as a k-NN analysis, in some implementations.

In a first analysis step, the clustering system may identify core objects from dataset D={$X_1, X_2, \ldots, X_3$} consisting of hit records for an application aggregated from a plurality of client devices. As used herein, a core object is one for which there are not less than MinPts neighbors in its ε neighborhood, where:

$$N_\varepsilon(X_j) = \{X_i \in D | \text{distance}(X_i, X_j) \le \varepsilon\};$$

$$\text{distance}(X_i, X_j) = \omega_{ij} \times \sqrt{\sum_{k=1}^{n}(X_{ik} - X_{jk})^2};$$

$$|N_\varepsilon(X_j)| \ge \text{MinPts};$$

The ε neighborhood is measured by the Euclidean distance multiplied by weights that scale the distance. The scale weight represents how important a data sample is on the core object determination. For example, if all data samples have equal importance, then $\omega_{ij}$ may be equal to 1. If the algorithm cares more about recent data samples, $\omega_{ij}$ is assigned based on the time interval. The recent access records are assigned with smaller weights to make them closer to the circle center for each cluster, while older ones are assigned bigger weights to move them away from the circle center. As a result, the recent access records play more of a role on core object determinations.

The ε neighborhood of all core objects are shown with black circles in the scatter chart of FIG. 5A. The hyper-parameters used for the example include ε of 0.16, MinPts of 2, n is 3, and $\omega_{ij}$ is 1. In other implementations, different values of these hyper-parameters may be used. In the first analysis step, core objects and their neighbors are used, while noise samples are excluded to avoid false alarm.

In a second analysis step, application access records are divided into or associated with clusters based on data density as follows:

1) Initialize a dataset D={$X_1, X_2, \ldots, X_m$} to track hit records.
2) Build a list of core objects identified in the first analysis step, such as Ψ={$X_2, X_3, X_4, X_8, X_{11}, X_{13}, X_{18}, X_{19}, X_{20}$};
3) Randomly select one core object from W as a starting point, and add it into a queue Q, such as {$X_2$};
4) Find directly density-reachable neighbors, and append them into queue Q if no duplicated neighbor exists in the current queue Q. For example, once appended, the queue may include {$X_2, X_4, X_6, X_{11}, X_{12}$};
5) Add the core object and its neighbors found in step 4 into a temporary cluster Ck={$X_2, X_4, X_6, X_{11}, X_{12}$};
6) Remove core objects found in step 3 and 4 from object list Ψ;
7) Repeat steps from 4 to 6 with next item in queue Q to find density-reachable items until all items are retrieved in queue Q;
8) Complete a specific data clustering based on Ck;
9) Empty queue Q and cluster Ck; and
10) Repeat steps from 3 to 9 until core object list Ψ is empty.

In a third analysis step, the system may build a simple clustering boundary with pruning or dimension reduction to avoid overfitting. In many implementations, one or more data clusters could be built, such as clusters C1, C2, C3 shown in the scatter chart of FIG. 5A. In many implementations, an application recommendation may be determined as a binary classification based on a current time and location, resulting in either a Yes or No recommendation for providing a notification or adding an application to a ranked list. When a client device is moved to a position corresponding to a cluster at a time range corresponding to the cluster, a notification may be provided to the device based on the cluster analysis. For example, in the scatter chart of FIG. 5A, a rectangular boundary for cluster C2 may be described by left, top, width and height values such as (9:35, 3.3, 15, 0.5).

In some implementations, the application level clustering algorithm may aggregate data samples over an extended time period, such as 30 days, while excluding data from a present time period or recent time period (e.g. past day) to avoid frequent clustering requests when new data sample arrives in the current day. Incremental recalculations of clusters may be triggered responsive to data from a previous time period being uploaded from client devices to the server. The server may first calculates internal distance across new data samples from the previous time period, and then calculate external distance between new data samples in the previous time period and older samples from the prior time periods (e.g. previous 29 days, in some implementations). With daily incremental calculations, the time complexity of the clustering algorithm is o(n), compared to o($n^2$) for a normal data clustering algorithm with $C_N^2$.

In many implementations, a cold start phase may be utilized for application level clustering algorithm before data samples from a full time period (e.g. 30 days or more) are available. In such a cold start phase, data may be collected, but no collaborative filtering or clustering may be applied in some implementations, to allow sufficient data to be obtained for cluster analysis.

Figure 5B:
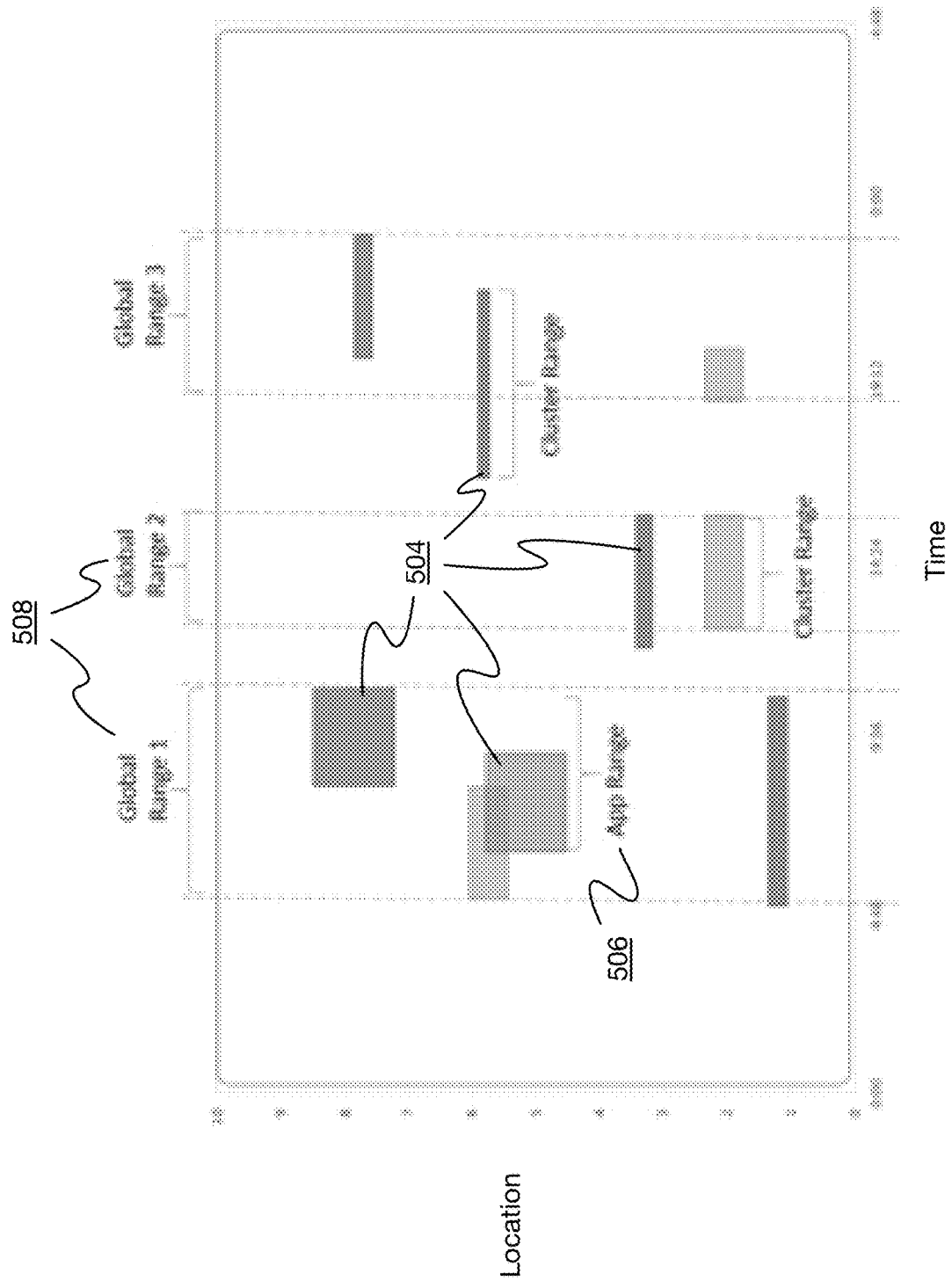
FIG. 5B is an example graph of clusters bounded by location and time, according to some implementations.

Accordingly, an application access record may be described by an n-dimensional feature vector comprising access time, latitude and longitude location, such as "9:09 AM, 39° 52'48"N, 116° 24'20"E". One or more clusters are built based on data density with application access record data samples over a prior time period (e.g. past 30 days, not including the current day). Each cluster may define or be associated with a time range and a geographic area. In many implementations, different clusters may overlap in time ranges or/and geographic areas. An example of this is shown in the graph of FIG. 5B, which illustrates a graph of clusters bounded by location and time, according to some implementations. As shown, clusters 504 may be defined by bounds of geographic coordinates (shown as a combined single dimension in FIG. 5B for ease of illustration) and times. Although shown with cluster ranges denoted over time periods, in some implementations, cluster ranges may be defined for geographic ranges at a given time.

In many implementations, a notification manager on a client device and/or executed by a notification server may periodically query the clustering results for applications in the client device's hot list, and determine if a notification should be pushed to the client or provided to a user of the client device. To reduce frequency of queries and save battery resources on mobile devices, in some implementations, when the active time range of an application (e.g. range 506, aggregated from the two shaded cluster ranges 504 overlapping in time and corresponding to a single application) is greater than a predetermined time period, such as 12 hours, a standup notification is posted for instant usage. Meanwhile, the application may be excluded from regular periodic queries. Similarly, in some implementations to reduce queries, cluster time ranges 504 may be aggregated into global level ranges 508 as shown by FIG. 5B. The notification manager may be activated and periodically check which applications should be notified for instant usage based on time and location during these global ranges 508.

In some implementations, the client device notification manager may keep standup applications in the notification center if they are still in the hot application list (such applications may be referred to as "pinned", "starred", or by similar terms), while periodically monitoring the device's location to determine if a notification message should be generated at a global level time range for other applications in the hot list. In some implementations, only a single notification may be provided per application in a global time range, and it may be removed when the present time is out of a global time range.

Figure 6A:
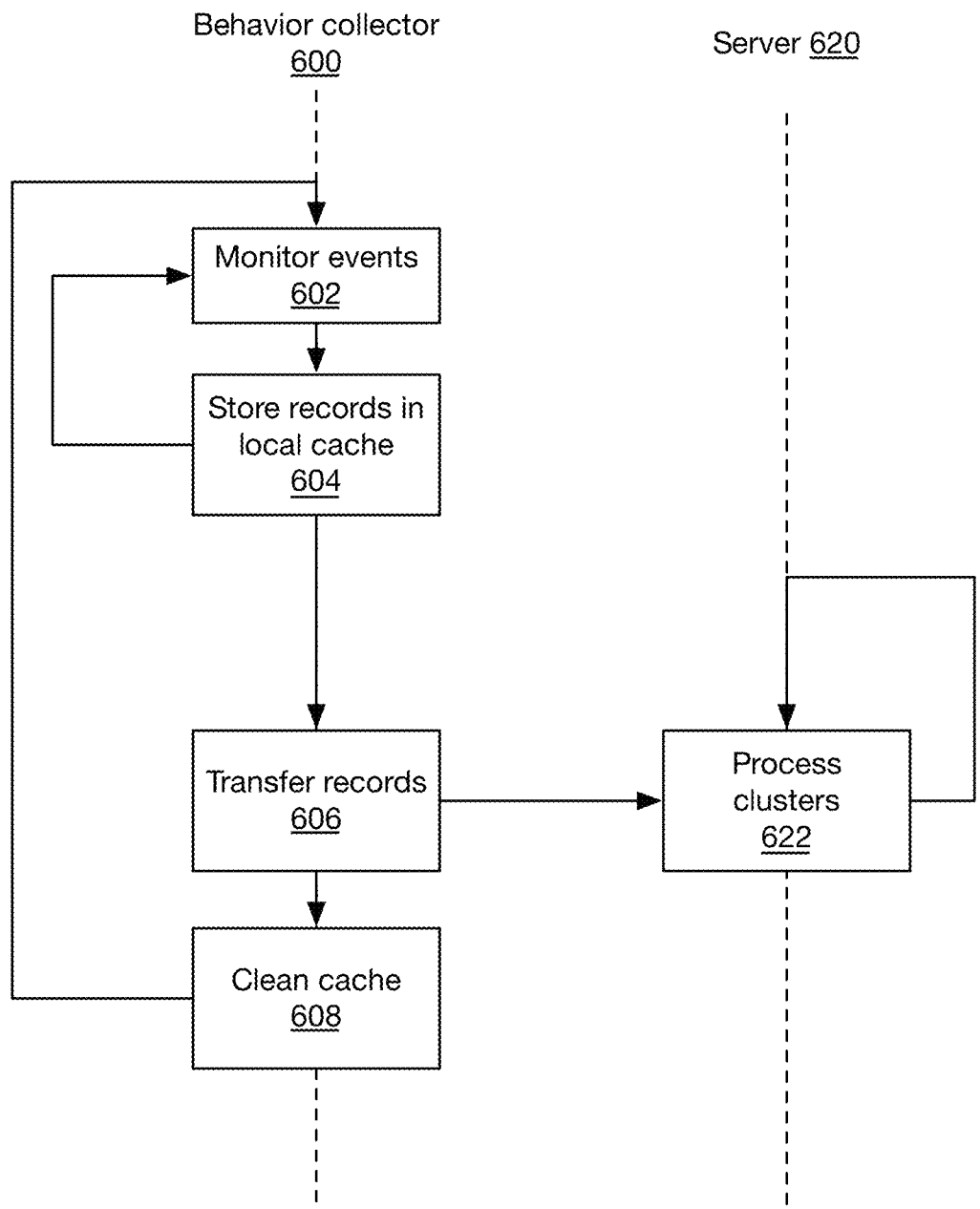
FIG. 6A is a swim lane diagram of a process for generating application access records and maintaining a cluster analysis, according to some implementations.

FIG. 6A is a swim lane diagram of a process for generating application access records and maintaining a cluster analysis. As discussed above, at step 602, a behavior collector 600 of a client device may monitor events for local, virtual, or hosted applications or tasks, including application launch, termination, instantiation, access, data reads and writes, etc. As discussed in connection with FIG. 4A, the behavior collector 600 may monitor executing processes, in some implementations (e.g. parsing a task list or process list for application names). In other implementations, behavior collector 600 may monitor access to particular data, such as a page of a web application or data file accessed by the application. In some implementations, the behavior collector 600 may monitor HTTP requests and responses to and from a web application by an embedded browser, monitor data file read or write operations by an operating system, or any other such methods. Behavior collector 600 may also gather environmental information at the time of a status change or application event. The environmental information may include a start time or end time of the status change of the application (e.g. based on a present time when the change occurs), a location of the device (e.g. gathered from location services of an operating system of the device, read from a GPS sensor or geolocation service, etc.), an active calendar appointment or meeting or similar event, and/or any other such information as discussed above.

At step 604, the behavior collector 600 may store event records in a local database or cache. The record may comprise an identification of the application or task, an identification of the status change, an identification of the time, an identification of the device location, and/or any other such information. The record may comprise fields in an array or database entry, concatenated values, parameter-value pairs, XML or JSON data, or any other such information. Steps 602-604 may be repeated iteratively for each new event.

At step 606, in some implementations, the behavior collector 600 may periodically transfer cached records to a server 620 for data clustering analysis. The transfer may occur at a predetermined time, such as midnight, or when the client device is powered on or rebooted, or any other such interval. In some implementations, data transfers from client devices may be staggered (e.g. with a random time offset or time offset based on a device identifier) to distribute or balance network bandwidth over time.

At step 608, in some implementations, the behavior collector 600 may remove older records or clean the record database or cache after transferring records to server 620. In some implementations, the behavior collector 600 may remove records older than a current time period and previous time period (e.g. present day and prior day). For example, given a time period of a day and transfers occurring at midnight each day, the behavior collector 600 may maintain records of the current day and previous day and remove records from two days prior (and older, if still existent).

At step 622, the server 620 may process the received event records for data clustering analysis as discussed above. In some implementations, the data clustering analysis may be repeated periodically (e.g. daily), or responsive to receipt of new records from a client device.

Figure 6B:
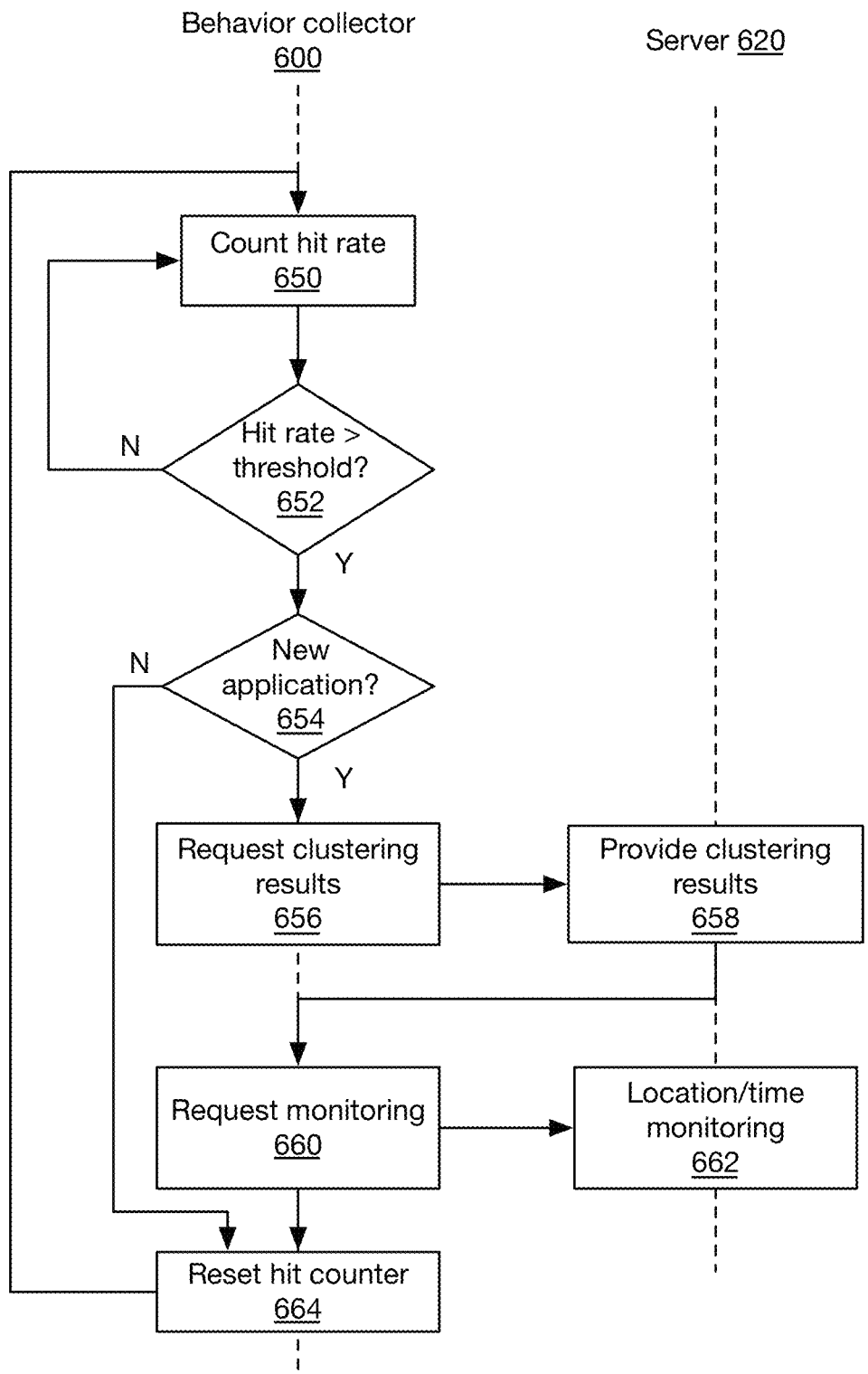
FIGS. 6B-6C are swim lane diagrams of a process for generating notifications for instant application usage based on time and location, according to some implementations.

FIG. 6B is a swim lane diagram of a process for generating notifications for instant application usage based on time and location, according to some implementations. At step 650, a behavior collector of a client device may count a hit rate or number of accesses of an application by a user of the device. The application may comprise a hosted application, local application, virtual application, or a task provided by an application as discussed above. In some implementations, the behavior collector may continue counting the access rate or hit rate until it exceeds a predetermined threshold at step 652.

Once the hit rate for the application exceeds the threshold, at step 654, the behavior collector or client device may determine if the application is a new application to the hot application list (i.e. if the application is not already listed in the hot list of applications or candidate list of applications ranked by hotness score). If the application is new to the list, then at step 656, the client device may request clustering results for the application from a server aggregating cluster results as discussed above. The server may provide the clustering results at step 658, which may comprise an identification of cluster boundaries (e.g. location and time boundaries), as well as weighted vectors for the application, aggregated access rate or cooling rate values, or any other such information as discussed above.

At step 660 in some implementations, the client device may monitor a present location of the device and a present time. In other implementations, the client device may request a server 620 to monitor a location of the device to push notifications. The location of the device may be periodically provided to the server 620 in such implementations. The server 662 may monitor the location of the device and present time and, upon determining that the location and time corresponding to boundaries of an application level cluster, the server may push a notification to the client device comprising an identification of the application or data of the application via a URI as discussed above. The identification may comprise a link to the application, an icon of the application, a title of the application, or any other such identification, and may be interactive (e.g. the user may select the identification to access the application or data). In other implementations, step 662 may be performed by the client device locally using the cluster boundaries received from the server. At step 664, the hit counter for the application may be reset, and steps 650-664 may be repeated. This may allow for periodic requests of updated cluster information for an application responsive to continued usage of the application by the user.

Figure 6C:
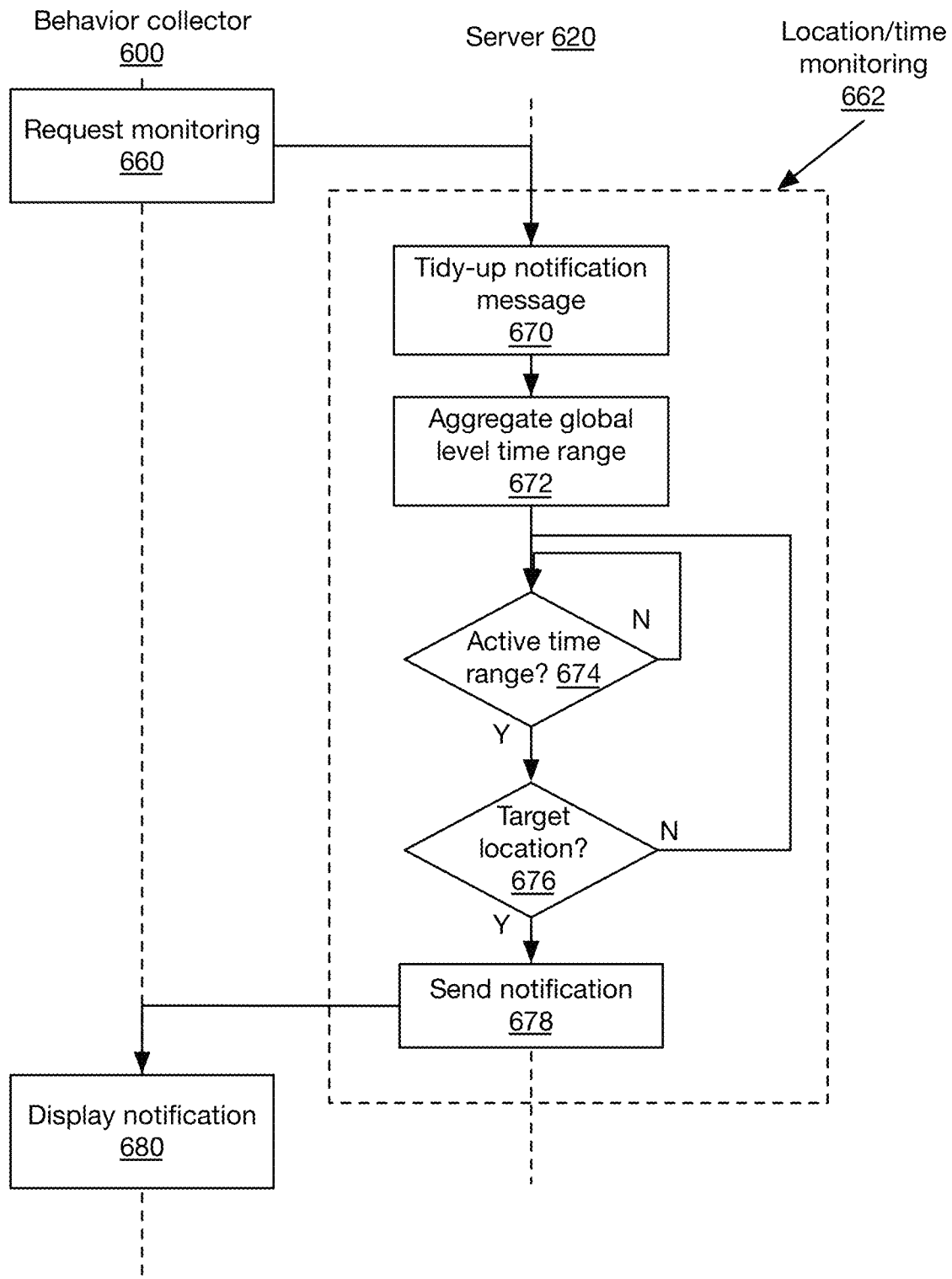

Some implementations of step 662 are shown in more detail in the swim lane diagram of FIG. 6C. Although shown performed by a server 620, in some implementations steps 670-678 may be performed by a notification manager of the client device. As discussed above, at step 660, a notification manager may be notified to begin monitoring a current time and a location of the device for application suggestions or notifications. The notification manager, either on the server or locally executed by the client device, may remove any old notification messages at step 670 or perform other tidying operations (e.g. resetting counters, clearing temporary values, etc.).

At step 672, the notification manager may determine aggregated application level and/or global level time ranges as discussed above. The aggregated application level time ranges may comprise a range of time during which application clusters are temporally overlapping, or otherwise may indicate a contiguous block of time having one or more clusters for a particular application with no periods of time with no existing clusters for the application, whether in the same location boundaries or different boundaries. Similarly, the aggregated global level time ranges may comprise contiguous periods of time having one or more application clusters with no periods during which no application cluster is active, as shown in FIG. 5B.

At step 674, the notification manager may determine whether a current time is within an active time range for a cluster. If so, then at step 676, the notification manager may determine whether a current location of the device is within boundaries of the cluster. In some implementations, steps 674 and 676 may be performed in reverse order. If neither condition is true, then steps 674-676 may be repeated iteratively (e.g., until the end of an aggregated global time range, in some implementations). If the device is within the boundaries defined by the cluster during the time corresponding to the cluster, then at step 678, the notification manager may generate a notification comprising an identification of the application or data of the application (e.g. via a URI as discussed above). At step 680, the client device may provide the notification to a user, allowing the user to select or click on the notification to launch the application (which may be pre-launched in some implementations, as discussed above).

Figure 7:
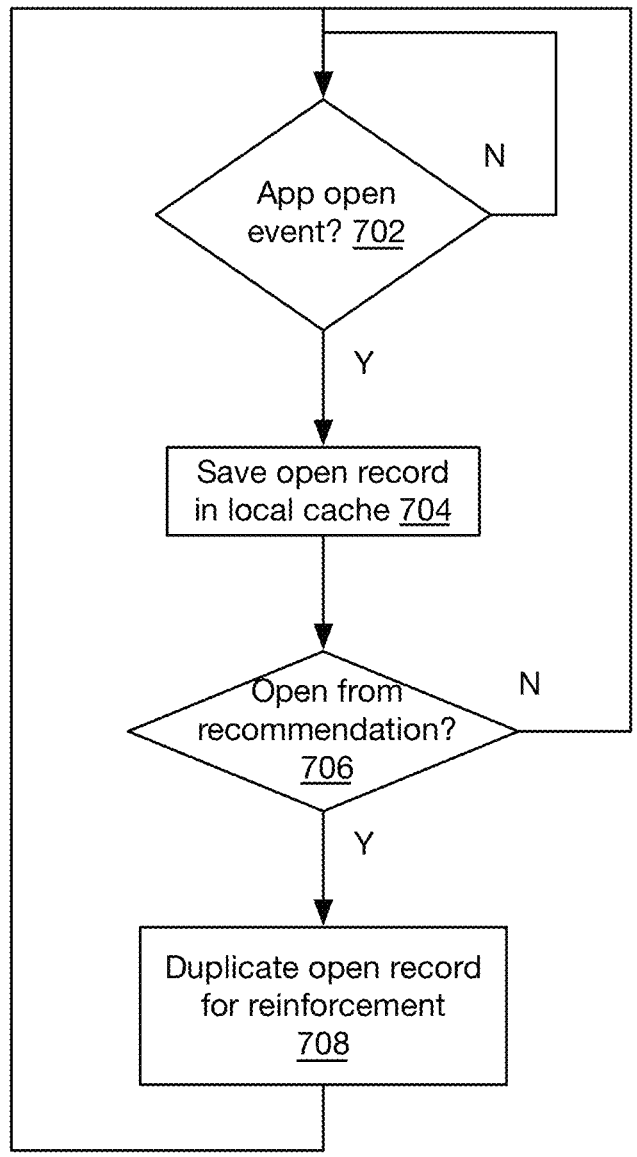
FIG. 7 is a flow chart of a method for generating application event records, according to some implementations.

FIG. 7 is a flow chart of an implementation of a method for generating application event records. At step 702, a behavior collector of a device may monitor for launch of an application or access to data of an application. As discussed above, application launch may be determined via monitoring of executing processes, in some implementations (e.g. parsing a task list or process list for application names). In other implementations, the behavior collector may monitor access to particular data, such as a page of a web application or data file accessed by the application. In some implementations, the behavior collector may identify a launch of an application or access to data of a web application by monitoring HTTP requests and responses to and from a web server by an embedded browser, by monitoring data file read or write operations by an operating system, or any other such methods.

Upon detecting an application open or launch event, at step 704, the behavior collector may generate a record of the application launch event, along with environmental data as discussed above. The record may comprise an identification of the application or task, an identification of the time and date, an identification of the device location including latitude and longitude, and/or any other such information. The record may comprise fields in an array or database entry, concatenated values, parameter-value pairs, XML or JSON data, or any other such information.

As discussed above, the user may launch the application or access data on their own, or via the recommendation system (e.g. via a notification or ranked list of suggested applications or tasks). At step 706, the behavior collector may determine whether the user launched the application via the recommendation system, or on their own. This may be determined by identifying whether the user selected the notification or link within the list of applications or tasks (e.g. by monitoring requests from a notification manager or workspace application, by hooking or intercepting commands from an input device, etc.).

If the user launched the application via the recommendation system, at step 708, the record may be duplicated for reinforcement of the recommendation learning system, or a score or counter associated with the record or application may be incremented.

Figure 8:
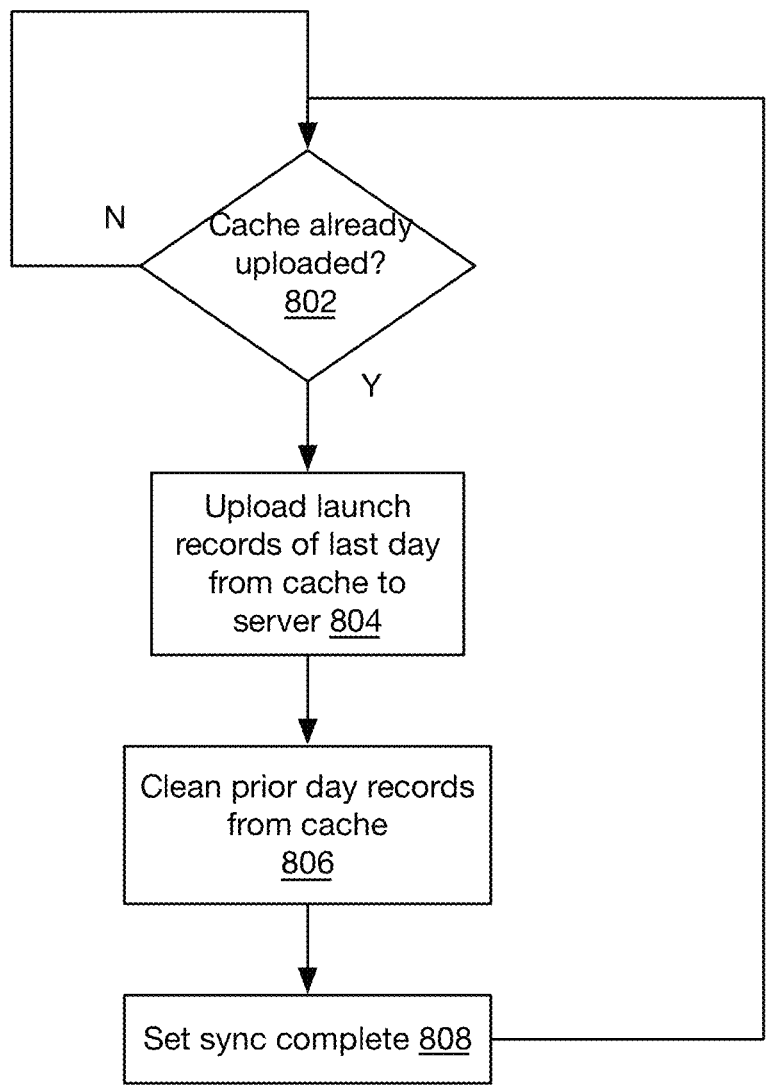
FIG. 8 is a flow chart of a method for providing records to an aggregation or clustering server, according to some implementations.

FIG. 8 is a flow chart of an implementation of a method for providing records to an aggregation or clustering server, in some implementations. For example, in many implementations, at step 804, cache data from a previous time period is uploaded from client devices to the server at a predetermined time (e.g. midnight) or the first time when the client device powers on. This may be triggered responsive to expiration of a timer maintained at step 802, or upon detecting power on or reboot of the client device at step 802 (and, in some implementations, responsive to determining that the records were not uploaded prior to reboot of the device). In some implementations, the determination may be made by reading the value of a synchronization indicator stored in memory (e.g. a predetermined bit indicating whether records have been uploaded or not, a record of a last synchronized time, etc.). Such synchronization indicators may be set (e.g. at step 808) and reset at a predetermined time or in response to an event (e.g. upon generation of a new record, as discussed in connection with FIG. 7).

As discussed above, at step 804, records from a previous time period may be uploaded to a server for aggregation and cluster analysis. At step 806, after a successful upload, the client device may clean up data records from a previous time period (e.g. two time periods before the present time period, such as two days prior) to save cache size, and may update a synchronization indicator at step 808. In some implementations, the client device may also transmit a synchronization indicator to the aggregation server to trigger data clustering calculation based on the latest data.

Similarly, in some implementations, a server device may also clean old records t step 806, such as removing records from prior to a predetermined time window (e.g. 30 days, or any other such window of time), responsive to receipt of records for a new time period from one or more client devices.

Figure 9:
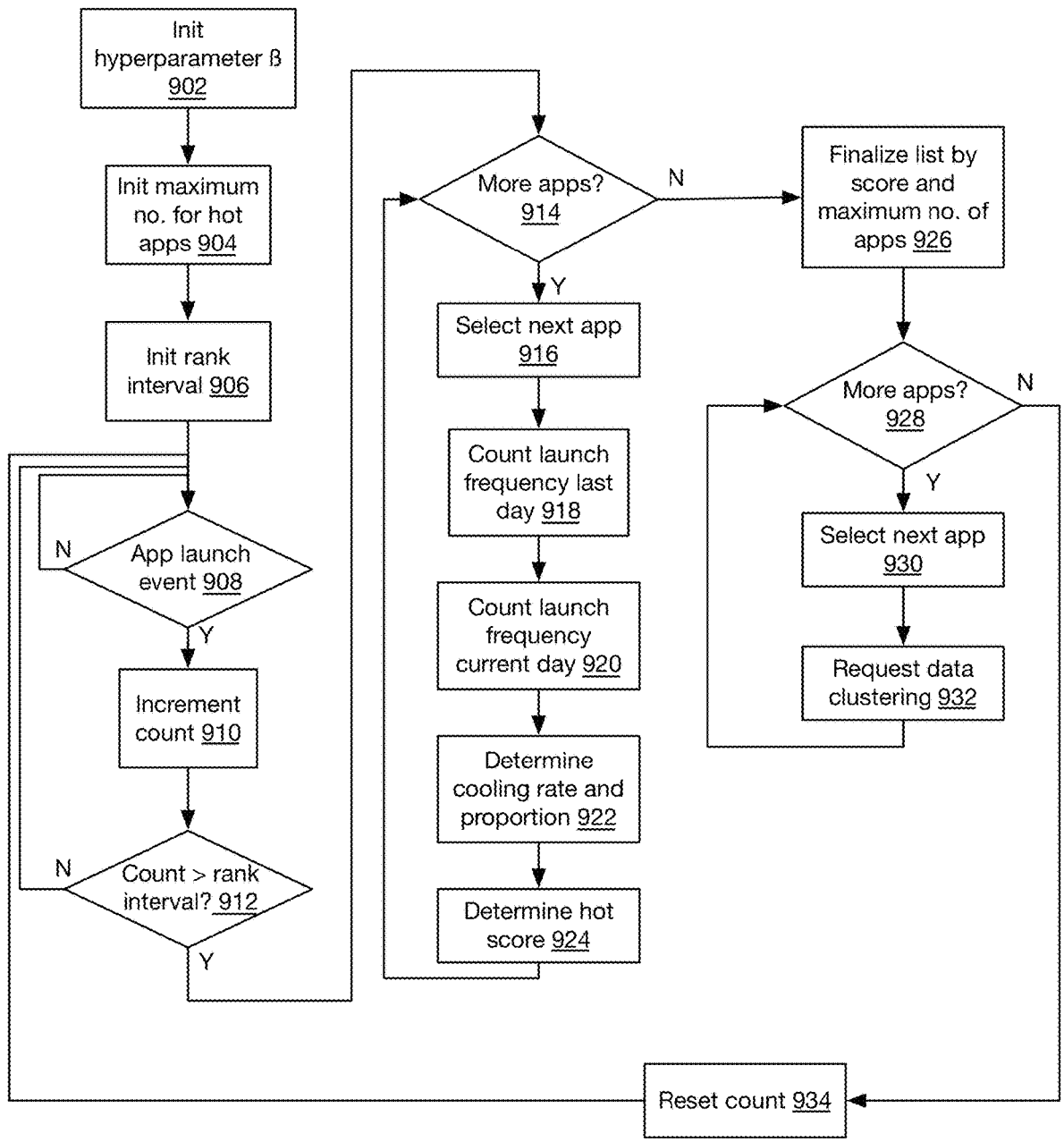
FIG. 9 is a flow chart of a method for ranking applications, according to some implementations.

FIG. 9 is a flow chart of a method for ranking applications, according to some implementations. In brief overview, a behavior predictor executed by a client device or, in some implementations, by a server, may start calculating hotness scores for activated applications within a recent time period (e.g. two days), responsive to the total launches or access of applications on the client device exceeding a threshold value in a sample period. The application level hotness score may be determined by its gradient change and access proportion over the recent time period. When the number of applications with non-negative scores is less than a maximum threshold, those candidate applications may be directly added into a hot application or task list. Otherwise, the candidate applications may be sorted by hotness score, and then the top n applications may be added into the hot application list, where n is not greater than a predetermined maximum threshold.

To calculate the scores, the behavior predictor requests the latest clustering results for each application from an aggregation server, and may cache them in local storage. As discussed above, in many implementations, this may only be done for new applications added to the hot application list, to avoid unnecessary and frequent data exchange between client devices and the aggregation server.

Still referring to FIG. 9 and in more detail, at step 902, a behavior predictor may initialize hyperparameters for calculation of hotness and cooling. At step 904, the behavior predictor may initialize a maximum number of applications to include in a hot application list (which may be as low as one, in some implementations). At step 906, the behavior predictor may initialize a rank recalculation interval threshold. This threshold may be used to indicate when scores should be recalculated (e.g. to prevent the system from recalculating scores with every application launch, which may waste processing resources, and result in scores that change too quickly and applications that get reordered too often).

To update application hotness scores and ranks, at step 908, the behavior predictor may monitor application launch events. Upon detecting an application launch, at step 910, the behavior predictor may increment an access or launch counter for the application or corresponding task. At step 912, in some implementations, the behavior predictor may determine whether the total number of application launch events exceeds a rank recalculation interval threshold. If not, steps 908-912 may be repeated.

Upon exceeding the rank recalculation interval threshold, at step 916, the behavior predictor may select a first task or application of the host applications identified in a queue (step 914 may be optionally performed, or may be skipped since when there is a first application at step 914). At step 918, the behavior predictor may determine a launch or access frequency for the selected task or application on a previous time interval (e.g. previous day). At step 920, the behavior predictor may determine a launch or access frequency for the selected task or application on a current time interval (e.g. current day). At step 922, the behavior predictor may determine a cooling rate and proportion for the application or task, and at step 924, may determine a hotness score or rank, as discussed above. Steps 914-924 may be repeated iteratively for each additional application identified in the queue.

Once hotness scores or ranks have been calculated for the applications or tasks, at step 926, the behavior predictor may finalize and order the hot application list by score or rank. In some implementations, the behavior predictor may limit the hot application list to a predetermined number of applications (e.g. maximum number of hot applications, set at step 904). To utilize collaborative filtering and cluster analysis, at step 930, the behavior predictor may select an application or task, and at step 932 may retrieve data clustering values (e.g. time and location boundaries, or other such information, as discussed above) for the application. Steps 928-932 may be repeated iteratively for each additional application or task in the hot application list. Once complete, the list may be provided to a user and/or notifications may be generated based on the cluster boundaries. At step 934, the launch or access counter may be reset, and steps 908-934 may be repeated.

Figure 10A:
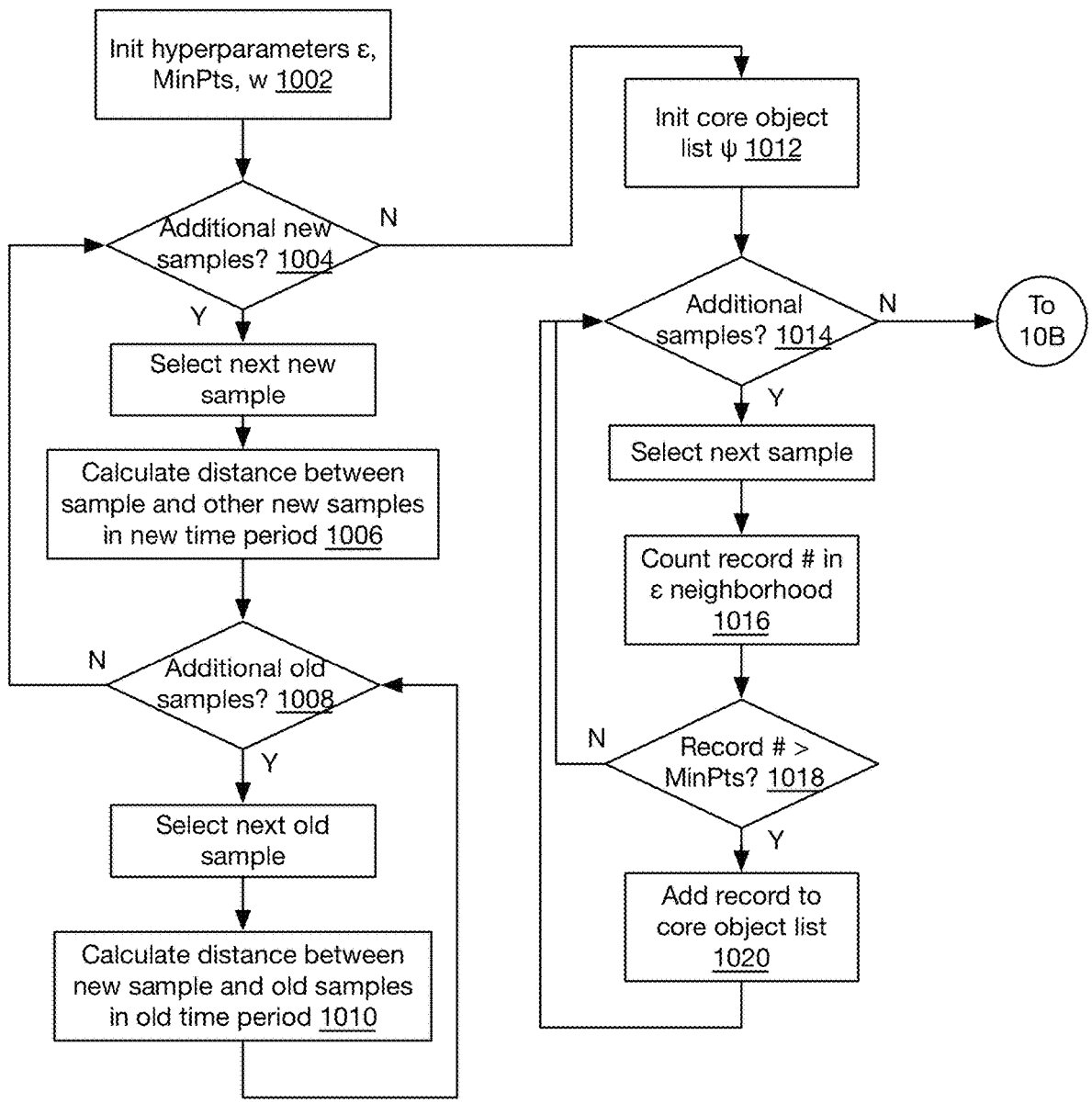
FIGS. 10A-10B are a flow chart, divided across two figures, of a method for performing clustering analysis, according to some implementations.
Figure 10B:
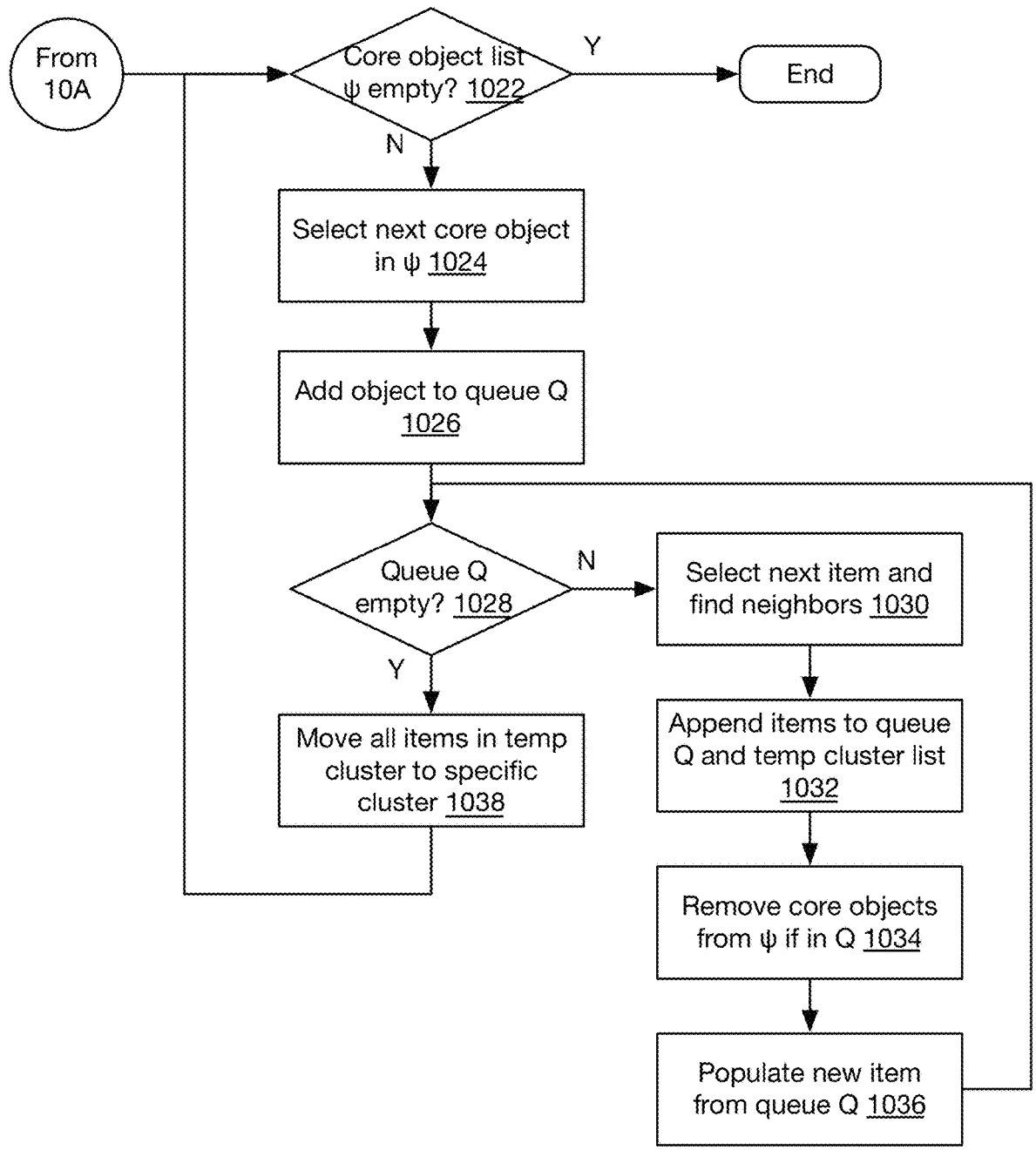

FIGS. 10A-10B are a flow chart, divided across two figures, of a method for performing clustering analysis, according to some implementations. In brief overview, the clustering calculation may be triggered for applications or tasks accessed by a client device either when new data is uploaded to the server periodically or when the device is powered on, or when there is have been no active records received within a predetermined time period. In some implementations, the clustering calculation may be triggered for applications or tasks that have a sufficient number of open records (e.g. exceeding a time window, such as 30 days). If an application or task has open records from a prior time period, the system may determine vector distances between samples from the prior time period and other prior time periods within the time window (e.g. the previous 29 days, not including the immediately previous day), and then clusters the samples based on data density. If an application or task has no open activity within the previous time period, the system may instead determine clusters based on samples in the most recent time window (e.g. previous 30 days). Accordingly, the data clustering system may determine vector distance measurements by incremental calculations; may detect core objects of the samples; may enumerate density-reachable objects relative to the core objects; and may identified clusters and corresponding boundaries.

Still referring to FIG. 10A and in more detail, at step 1002, an aggregating or cluster analyzing server may initialize hyperparameters for the cluster analysis. At step 1004, the aggregating or cluster analyzing server may determine if new samples or records have been received. A next sample may be selected, and at step 1006, the aggregating or cluster analyzing server may calculate a distance between the sample and other samples in the current time period (e.g., the present day or any other such time period). At step 1008, the aggregating or cluster analyzing server may determine if other samples or records exist in memory, and if so may select an old sample, and determine a distance between the new sample and old sample at step 1010.

Steps 1008-1010 may be repeated for each additional old sample in memory with the selected new sample. Steps 1004-1010 may also be repeated for each additional new sample received from client devices.

Once the sample distances have been determined, at step 1012, the aggregating or cluster analyzing server may initialize a core object list. Starting with a first sample, at step 1016, the aggregating or cluster analyzing server may determine the number of other records or samples within a given neighborhood distance c from the first sample. At step 1018, the aggregating or cluster analyzing server may determine if the number of records within the neighborhood distance exceeds the MinPts threshold. If so, at step 1020, the record or first sample may be added to a core object list. Steps 1014-1020 may be repeated for each additional sample.

Turning to FIG. 10B, (since the core object list is not empty at step 1022), at step 1024, the aggregating or cluster analyzing server may select a next sample or record in the core object list, and at step 1026, may add the selected sample or record to a queue. Since the queue is not empty at step 1028, at step 1030, in some implementations, the aggregating or cluster analyzing server may select a record or sample in the queue and find its neighbors (e.g. within a predetermined distance). The neighbor items may be added to the queue, and to a temporary list for the cluster at step 1032. If any of the neighbor items added to the queue are on the core object list, then at step 1034, they may be removed from the core object list. This may be done to consolidate core objects belonging to the same cluster. At step 1036, the aggregating or cluster analyzing server may move the first sample or record from the queue to the temporary cluster list. Steps 1028-1036 may be repeated iteratively for each additional sample or record in the queue (e.g. items added based on being neighbors of a selected item). This may result in iteratively expanding cluster boundaries to incorporate neighbor items and additional items that are close neighbors of neighbor items. Once the queue is empty, at step 1038, the aggregating or cluster analyzing server may move items in the temporary cluster list to a list for a new cluster. Steps 1022-1038 may be repeated iteratively for each additional sample or record in the core object list.

Figure 11A:
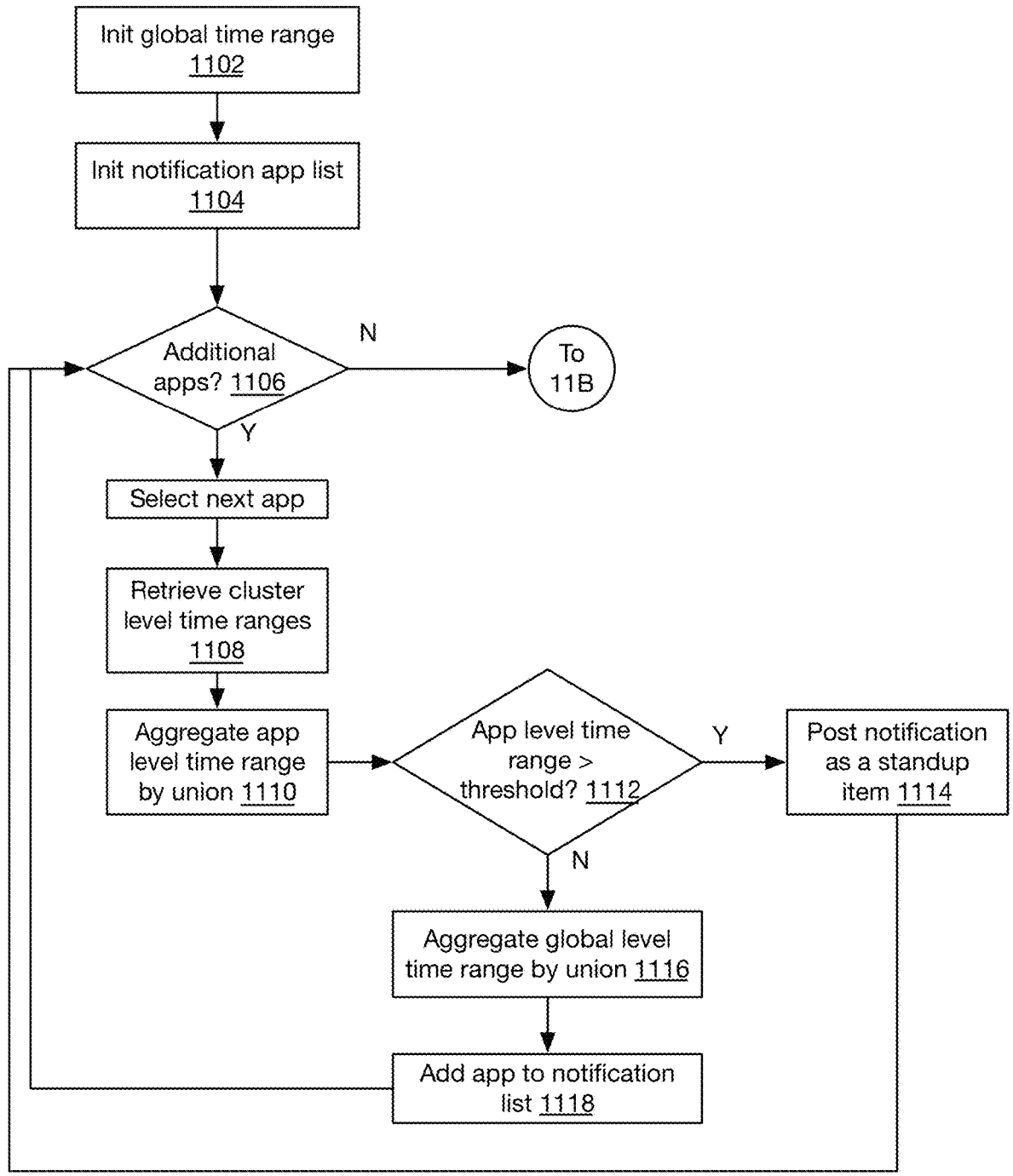
FIGS. 11A-11B are a flow chart, divided across two figures, of a method for providing suggested applications or tasks, according to some implementations.
Figure 11B:
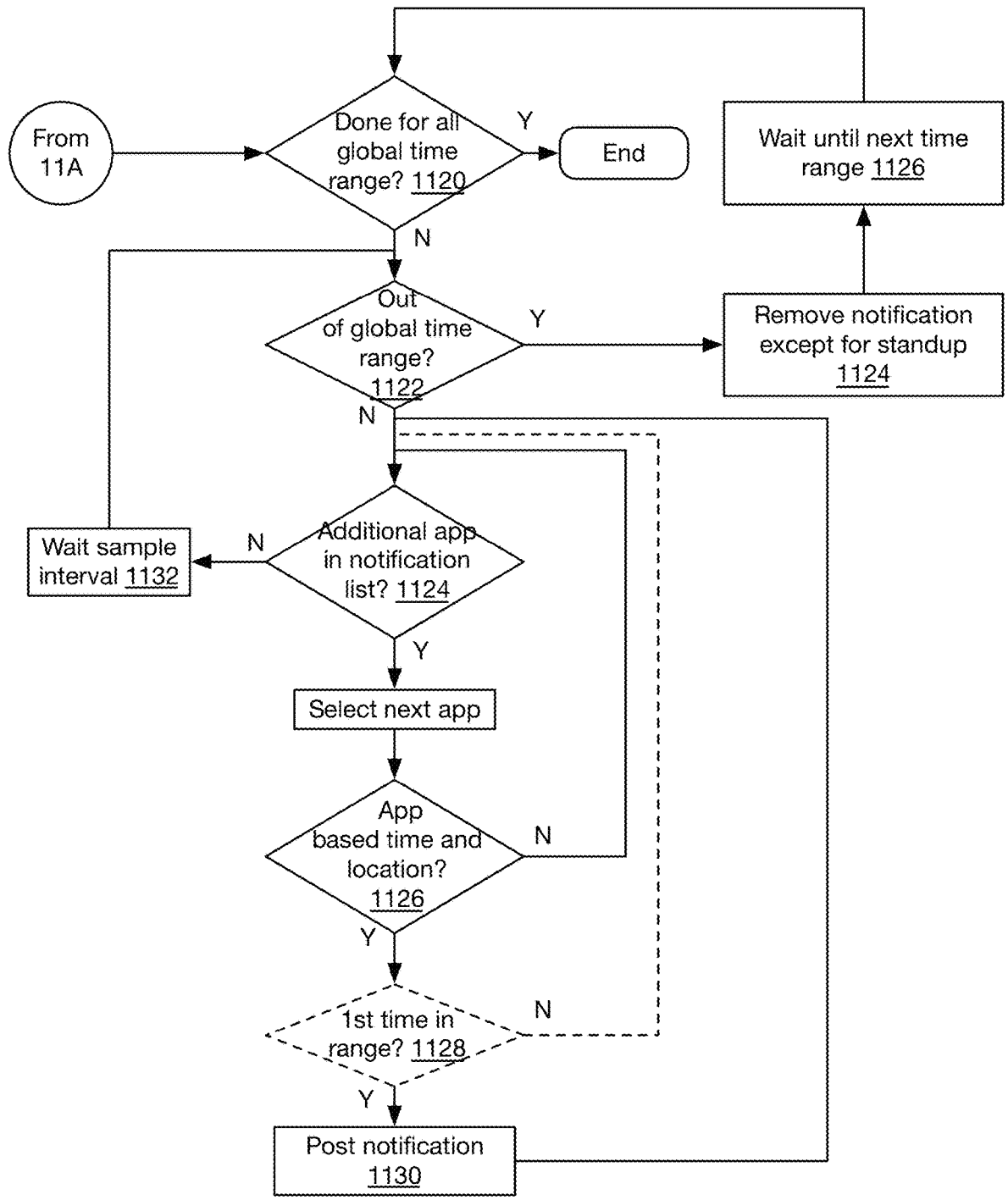

FIGS. 11A-11B are a flow chart, divided across two figures, of a method for providing suggested applications or tasks, according to some implementations. In brief overview, a notification manager may loop through applications or tasks in a hot application list to aggregate cluster level time intervals from small pieces (e.g. individual clusters) to larger contiguous time ranges at the application level. The notification manager may then aggregate or determine a union of applications' time ranges at a global level. In order to avoid processing resources with constant monitoring and to save battery resources of the device, the global level aggregation may exclude standup or pinned applications or tasks with more than a predetermined active time range (e.g. greater than 12 hours).

The notification manager may provide notifications of one or more selected applications, or a list of applications or tasks ranked by hotness score. In some implementations, standup or pinned applications may be kept in a notification center or list of applications if the applications are still in a hot application list. The notification manager may periodically monitor a location of the computing device for other unpinned applications in the hot list and may determine if a notification message should be posted at the beginning of or within a global level time range. In some implementations, only one notification is posted per application in a global time range, and it may be removed when the present time is out of the global time range. As a result, the notification messages may be well organized for instant access by a user.

Still referring to FIG. 11A and in more detail, at step 1102, a notification manager may initialize a global time range, and at step 1104 may initialize a notification application or task list (e.g. by removing existing notifications, in some implementations). The notification manager may select an application or task in a hot application list and may retrieve cluster level time ranges at step 1108 from an aggregating or cluster analysis server. At step 1110, the notification manager may aggregate application level time ranges (e.g. from cluster ranges corresponding to a single application or task) via a union into application level ranges, as discussed above. At step 1112, the notification manager may determine if the application level range time exceeds a threshold (e.g. 12 hours). If so, then at step 1114, the notification manager may designate the application or task as a standup or pinned task or application, and may generate a pinned notification for the application or place the application in a designated place on a list of suggested applications.

If the aggregated application level time range does not exceed the threshold, then at step 1116, the notification manager may determine an aggregated global level time range as a union of cluster level time ranges for the application. At step 1118, the application may be added to the notification list. Steps 1106-1118 may be repeated iteratively for each additional application in the hot application list.

Turning to FIG. 11B, at step 1120, the notification manager may determine if the global time ranges for the day are complete. If not, then at step 1122, the notification manager may determine whether the present time is outside of a global time range. If so, then at step 1124, the notification manager may remove any notifications (other than standup or pinned notifications or items in a list of suggested applications), and at step 1126, may wait until the start of a subsequent global time range.

When the present time is within a global time range, at step 1124, the notification manager may determine if additional applications exist in the notification list (e.g. other than any standup or pinned applications). If so, then the notification manager may select a next application in the list, and at step 1126 may determine if the current location of the device and a current time is within a cluster boundary for the application. If so, in some implementations, at step 1130, the notification manager may generate a notification for the application or task (e.g. including a URI or a link to the application or data of the application). As discussed above, in some implementations, the notification manager may determine if the cluster for the application is the first cluster within the current global time range at step 1128. In such implementations, the notification manager may provide the notification only if the cluster is the first cluster for the application within the current global time range, to prevent multiple notifications from being provided with the global time range for the same application or task. Steps 124-130 may be repeated for each additional application in the notification list. If no applications remain in the list, then at step 1132, the notification manager may wait a predetermined period of time (e.g. a sample interval, such as 1 minute, 5 minutes, 10 minutes, or any other such interval). Steps 1122-1132 may then be repeated.

Accordingly, the systems and methods discussed herein provide for intelligent identification of applications or tasks to be utilized or performed by a user based on a variety of variables that provide relevant context. In some implementations, applications may be pre-launched or instantiated prior to a user requesting to execute the application, reducing user experience latency and avoiding incorrect application launch. In some implementations, applications that are rarely utilized or will likely not be utilized in an upcoming time period and/or data associated with the applications may be removed from the computing device to reduce memory usage, and may be pre-fetched or downloaded in advance of a time period in which the applications will likely be used. User behavior patterns, location, time of day, user events, etc. may be utilized to identify and recommend or pre-launch relevant applications that should or can be used at any given instance. In some implementations, deep linking may be used to pre-launch or suggest specific tasks to be performed within an application (e.g. a link to specific data or pages within a web application associated with the identified task).

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A computing device, comprising: a processor, a location sensor, and a memory storing a first application, wherein the processor is configured to: receive a location of the computing device via the location sensor; identify a current time; determine that the location of the computing device and the current time correspond to a time and location pattern associated with the first application and to a second time and location pattern associated with a second application; calculate a first score for the first application and a second score for the second application based on a number of accesses to the corresponding application by a plurality of computing devices in a time period while computing devices of said plurality of computing devices are within a distance of the location of the computing device; and provide an identification of the first application and an identification of the second application via a user interface of the computing device, responsive to the determinations that the location of the computing device and the current time correspond to the time and location pattern associated with the first application and correspond to the second time and location pattern associated with the second application, wherein the identification of the first application and the identification of the second application are provided in order according to the first score and the second score.

2. The computing device of claim 1, wherein the processor is further configured to launch the first application while suppressing display of output of the first application, responsive to the determination that the location of the computing device and the current time correspond to the time and location pattern associated with the first application.

3. The computing device of claim 2, wherein the processor is further configured to display output of the first application, responsive to detecting an interaction via the user interface with the identification of the first application.

4. The computing device of claim 1, wherein the processor is further configured to:
detect a launch of the first application responsive to an interaction with a user interface of the computing device;
identify a time of launch of the first application and a location of the computing device at the time of launch of the first application; and
generate the time and location pattern associated with the first application based on the identified time of launch of the first application and the location of the computing device at the time of launch of the first application.

5. The computing device of claim 1, wherein the processor is further configured to:
calculate the first score for the first application and the second score for the second application, based on a historical log of access to the first application and second application by the computing device.

6. The computing device of claim 1, wherein the processor is further configured to calculate each of the first score and the second score based on a number of accesses to the corresponding application by the computing device in a time period.

7. The computing device of claim 6, wherein the processor is further configured to calculate each of the first score and the second score, adjusted by a cooling function.

8. The computing device of claim 6, wherein the processor is further configured to calculate each of the first score and the second score proportional to a proportion of accesses of the corresponding application out of a number of accesses of all applications by the computing device during the time period.

9. A method, comprising: receiving, by a processor of a computing device via a location sensor of the computing device, a location of the computing device; identifying, by the processor, a current time; determining, by the processor, that the location of the computing device and the current time correspond to a time and location pattern associated with a first application and to a second time and location pattern associated with a second application; calculating a first score for the first application and a second score for the second application based on a number of accesses to the corresponding application by a plurality of computing devices in a time period while computing devices of said plurality of computing devices are within a distance of the location of the computing device; and providing, by the processor via a user interface of the computing device, an identification of the first application and an identification of the second application, responsive to the determinations that the location of the computing device and the current time correspond to the time and location pattern associated with the first application and to the second time and location pattern associated with the second application, wherein the identification of the first application and the identification of the second application are provided in order according to the first score and the second score.

10. The method of claim 9, further comprising launching, by the processor, the first application while suppressing display of output of the first application, responsive to the determination that the location of the computing device and the current time correspond to the time and location pattern associated with the first application.

11. The method of claim 10, further comprising displaying output of the first application, via a display of the computing device, responsive to detecting an interaction via the user interface with the identification of the first application.

12. The method of claim 9, further comprising:
detecting, by the processor, a launch of the first application responsive to an interaction with a user interface of the computing device;
identifying, by the processor, a time of launch of the first application and a location of the computing device at the time of launch of the first application; and
generating, by the processor, the time and location pattern associated with the first application based on the identified time of launch of the first application and the location of the computing device at the time of launch of the first application.

13. The method of claim 9, further comprising:
calculating, by the processor, the first score for the first application and the second score for the second application, based on a historical log of access to the first application and second application by the computing device.

14. The method of claim 9, further comprising calculating, by the processor, each of the first score and the second score based on a number of accesses to the corresponding application by the computing device in a time period.

15. The method of claim 14, further comprising calculating, by the processor, each of the first score and the second score, adjusted by a cooling function.

16. The method of claim 14, further comprising calculating, by the processor, each of the first score and the second score proportional to a proportion of accesses of the corresponding application out of a number of accesses of all applications by the computing device during the time period.

17. A non-transitory computer-readable medium having instructions stored thereon that, when executed by a processor of a computing device, cause the computing device to: receive, via a location sensor of the computing device, a location of the computing device; identify a current time; determine that the location of the computing device and the current time correspond to a time and location pattern associated with a first application and to a second time and location pattern associated with a second application; calculate a first score for the first application and a second score for the second application based on a number of accesses to the corresponding application by a plurality of computing devices in a time period while computing devices of said plurality of computing devices are within a distance of the location of the computing device; and provide, via a user interface of the computing device, an identification of the first application and an identification of the second application, responsive to the determinations that the location of the computing device and the current time correspond to the time and location pattern associated with the first application and to the second time and location pattern associated with the second application, wherein the identification of the first application and the identification of the second application are provided in order according to the first score and the second score.

18. The computer-readable medium of claim 17, further comprising instructions that cause the computing device to:
launch the first application while suppressing display of output of the first application, responsive to the determination that the location of the computing device and the current time correspond to the time and location pattern associated with the first application; and
display output of the first application, responsive to detecting an interaction via the user interface with the identification of the first application.

* * * * *